(12) United States Patent
Park

(10) Patent No.: US 11,169,565 B2
(45) Date of Patent: Nov. 9, 2021

(54) DISPLAY DEVICE

(71) Applicant: Samsung Display Co., LTD., Yongin-si (KR)

(72) Inventor: Changmin Park, Gwangmyeong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/890,383

(22) Filed: Jun. 2, 2020

(65) Prior Publication Data

US 2021/0026410 A1    Jan. 28, 2021

(30) Foreign Application Priority Data

Jul. 26, 2019   (KR) .................. 10-2019-0090727

(51) Int. Cl.
   *G06F 1/16*   (2006.01)

(52) U.S. Cl.
   CPC .............. *G06F 1/16* (2013.01); *G06F 1/1681* (2013.01)

(58) Field of Classification Search
   CPC .... G06F 1/1641; G06F 1/1652; G06F 1/1681; G06F 1/1692; G09F 9/301
   See application file for complete search history.

(56) References Cited

U.S. PATENT DOCUMENTS

| 9,250,733 | B2 * | 2/2016 | Lee ...................... H04M 1/022 |
| 9,269,748 | B2 | 2/2016 | Liu et al. | |
| 10,082,839 | B1 * | 9/2018 | Turchin ................ G06F 1/1681 |
| 11,048,305 | B1 * | 6/2021 | Ye ........................ H04M 1/0206 |
| 11,073,870 | B2 * | 7/2021 | Yun ...................... G06F 1/1652 |
| 2013/0293444 | A1 * | 11/2013 | Sano ..................... G06F 3/1446 345/1.3 |
| 2016/0378203 | A1 * | 12/2016 | Kim ...................... G06F 1/1675 345/156 |
| 2018/0150106 | A1 | 5/2018 | Jang et al. | |
| 2018/0324964 | A1 | 11/2018 | Yoo et al. | |
| 2019/0012028 | A1 * | 1/2019 | Park ...................... H01L 27/323 |
| 2019/0041914 | A1 * | 2/2019 | Yeh ....................... G06F 1/1616 |
| 2019/0212786 | A1 * | 7/2019 | Lin ....................... G06F 1/1681 |
| 2020/0396852 | A1 * | 12/2020 | Yoo ...................... G06F 1/1698 |
| 2021/0223826 | A1 * | 7/2021 | Ye ......................... G06F 1/1652 |

FOREIGN PATENT DOCUMENTS

| EP | 2 690 521 | 1/2014 |
| KR | 10-2018-0122210 | 11/2018 |

\* cited by examiner

*Primary Examiner* — Anthony Q Edwards
(74) *Attorney, Agent, or Firm* — Kile Park Reed & Houtteman PLLC

(57) ABSTRACT

A display device includes a display module, first and second supporters disposed under the display module and arranged in a first direction, spacers disposed between the first and second supporters, third and fourth supporters respectively disposed under the first and second supporters, hinge parts connected to the third and fourth supporters, sliding parts disposed in openings defined in the third and fourth supporters and connected to the first and second supporters, and elastic parts disposed in guide grooves defined in the third and fourth supporters and extending in the first direction from the openings toward distal portions of the third and fourth supporters.

24 Claims, 19 Drawing Sheets

DISPLAY DEVICE

CROSS-REFERENCE TO RELATED APPLICATION

This U.S. non-provisional patent application claims priority to and benefits of Korean Patent Application No. 10-2019-0090727 under 35 U.S.C. § 119(a), filed on Jul. 26, 2019 in the Korean Intellectual Property Office, the contents of which are hereby incorporated by reference in its entirety.

BACKGROUND

Technical Field

The disclosure relates to a display device. More particularly, the disclosure relates to a display device capable of preventing a folding area from being deformed.

Description of the Related Art

Electronic devices that provide an image to a user, such as a smart phone, a digital camera, a notebook computer, a navigation unit, and a smart television, include a display device to display the image. The display device generates the image and provides the image to the user through a display screen thereof.

In recent years, with technological developments for display devices, various types of display devices are being developed. For example, various flexible display devices, which are foldable, rollable, or capable of being transformed into a curved shape, are being developed. The flexible display device is easy to carry with improved convenience.

Among the flexible display devices, a foldable display device is folded about a folding axis, which extends in one direction. However, in the foldable display device, previously unforeseen problems, such as deformation of the folding portion and damage of elements of the folding portion occur, and thus development of technology to solve the problems is required.

SUMMARY

The disclosure provides a display device capable of preventing a folding area from being deformed.

In an embodiment, a display device may include a display module, a first supporter and a second supporter disposed under the display module and arranged in a first direction, spacers disposed between the first and second supporters, a third supporter and a fourth supporter respectively disposed under the first supporter and the second supporter, hinge parts connected to the third and fourth supporters, sliding parts disposed in openings defined in the third and fourth supporters and connected to the first and second supporters, and elastic parts disposed in guide grooves defined in the third and fourth supporters and extending in the first direction from the openings toward a distal side of the third supporter and a distal portion of the fourth supporter. The spacers may be arranged in a second direction crossing the first direction, and the display module may be disposed between the spacers.

The display device may include grooves defined at portions where a first side of the third supporter is connected to a second side and a third side of the third supporter and at portions where a first side of the fourth supporter is connected to a second side and a third side of the fourth supporter, wherein the second side and the third side of the third supporter may be opposite to each other in the second direction, the second side and the third side of the fourth supporter may be opposite to each other in the second direction, the first side of the third supporter and the first side of the fourth supporter may face each other in the first direction, the grooves may extend in the second direction, and the spaces may be disposed in the grooves.

The hinge parts may be disposed on the third supporter and the fourth supporter and connected to portions of the third supporter and the fourth supporter, which are adjacent to the second and third sides of the third supporter and the second and third sides of the fourth supporter. The hinge parts may provide rotation axes extending in the second direction, to the third supporter and the fourth supporter, respectively, and the third supporter and the fourth supporter may rotate about the rotation axes. Each of the spacers may include a support bar connected to a lower portion of a corresponding one of the hinge parts and extending in the second direction; and a protrusion protruding upward from the support bar, wherein the support bars of the spacers may be disposed in the grooves, and the protrusions of the spacers may be disposed between the first supporter and the second supporter.

The protrusions may be disposed adjacent to a second side and a third side of the first supporter, which are opposite to each other in the second direction, and a second side and a third side of the second supporter, which are opposite to each other in the second direction. Each of the hinge parts may include a body portion overlapping the grooves in a plan view; and a first wing portion and a second wing portion connected to the body portion, extending in the first direction, and arranged in the first direction, wherein the first wing portion and the second wing portion may be respectively connected to the third supporter and the fourth supporter, and a side of the first wing portion and a side of the second wing portion, which face each other, may be connected to the body portion to rotate. The support bar may be connected to a lower portion of the body portion, and the protrusion may not overlap the first wing portion and the second wing portion in a plan view.

The display device may further include cover parts that may cover a second side and a third side of the first supporter, which are opposite to each other in the second direction, a second side and a third side of the second supporter, which are opposite to each other in the second direction, a second side and a third side of the third supporter, which are opposite to each other in the second direction, and a second side and a third side of the fourth supporter, which are opposite to each other in the second direction. The cover parts may be disposed on portions of the third and fourth supporters, which are adjacent to the second and third sides of the third supporter and the second and third sides of the fourth supporter, connected to the third supporter and the fourth supporter, and disposed on portions of the first supporter and the second supporter, which are adjacent to the second and third sides of the first supporter and the second and third sides of the second supporter. The cover parts may not overlap the hinge parts and may not be connected to the first and second supporters.

A first side of the third supporter and a first side of the fourth supporter may face each other in the first direction, and the openings may be adjacent to a distal side of the third supporter, which is opposite to the first side of the third supporter, and a distal side of the fourth supporter, which is opposite to the first side of the fourth supporter. The guide grooves may be defined between the openings defined in the third supporter and the distal side of the third supporter and between the openings defined in the fourth supporter and the distal side of the fourth supporter. The elastic parts may contact sides of the sliding parts facing the distal sides of the third and fourth supporters. Each of the sliding parts may include a bottom portion; and a moving portion extending upward from the bottom portion and disposed in a corresponding one of the openings, wherein the bottom portions of the sliding parts may be disposed under the third supporter and the fourth supporter, and the moving portions of the sliding parts may be connected to the first supporter and the second supporter. A width in the first direction of the bottom portion may be greater than each of the openings, and a width in the first direction of the moving portion may be smaller than each of the openings. The sliding parts connected to the first supporter and the sliding parts connected to the second supporter may move in a direction to be closer to each other by the elastic parts when the third supporter and the fourth supporter rotate by the hinge parts.

In an embodiment, a display device may include a display module, a first supporter and a second supporter disposed under the display module and arranged in a first direction, a spacer disposed between the first supporter and the second supporter, a third supporter and a fourth supporter respectively disposed under the first supporter and the second supporters, a hinge part connected to the third supporter and the fourth supporter, a sliding part connected to each of the first supporter and the second supporter through an opening defined in each of the third supporter and the fourth supporter, and an elastic part disposed between the sliding part and each of a distal side of the third supporter and a distal side of the fourth supporter, wherein the distal side of the third supporter and the distal side of the fourth supporter may be opposite to a first side of the third supporter and a first side of the fourth supporter, respectively, and the first side of the third supporter and the first side of the fourth supporter may face each other in the first direction. The sliding part connected to the first supporter and the sliding part connected to the second supporter may move in a direction to be closer to each other by the elastic part when the third and fourth supporters rotate by the hinge part.

The spacer may include a support bar disposed between the third supporter and the fourth supporter and connected to a lower portion of the hinge part; and a protrusion protruding upward from the support bar and disposed between the first supporter and the second supporter. The display module may not overlap the spacer in a plan view. The elastic part may be disposed in a guide groove defined in each of the third and fourth supporters and extending in the first direction from the opening and contacts the sliding part. The sliding part may include a bottom portion; and a moving portion extending upward from the bottom portion, disposed in the opening, and connected to a corresponding one of the first and second supporters, wherein a width in the first direction of the bottom portion may be greater than the opening, and a width in the first direction of the moving portion may be smaller than the opening.

In an embodiment, a display device may include a display module, a first supporter disposed under the display module, a second supporter arranged in a first direction with the first supporter and disposed under the display module, a third supporter disposed under the first supporter, a fourth supporter disposed under the second supporter, a spacer disposed between the first supporter and the second supporter and between the third supporter and the fourth supporter, a hinge part connected to the third support and the fourth supporter, a first sliding part disposed in a first opening defined in the third supporter and connected to the first supporter, a second sliding part disposed in a second opening defined in the fourth supporter and connected to the second supporter, a first elastic part disposed in a first guide groove defined in the third supporter and extending toward a distal side of the third supporter, which is opposite to a first side of the third supporter, from the first opening, and a second elastic part disposed in a second guide groove defined in the fourth supporter and extending toward a distal side of the fourth supporter, which is opposite to a first side of the fourth supporter, from the second opening. The first side of the third supporter and the first side of the fourth supporter may face each other in the first direction.

According to the above, when the display device is folded, the first supporter and the second supporter, which support the display module, may move to a center portion of the display device. Thus, a tensile force in the folding area may be reduced, and the folding area may be prevented from being deformed.

BRIEF DESCRIPTION OF THE DRAWINGS

Embodiments will be described by reference to the following detailed description when considered in conjunction with the drawings. However, the invention is not limited to the embodiments described in the specification. Other embodiments and/or modifications may be made by one of ordinary skill in the art without departing from the spirit and scope of the disclosure.

DETAILED DESCRIPTION OF THE EMBODIMENTS

Figure 1:
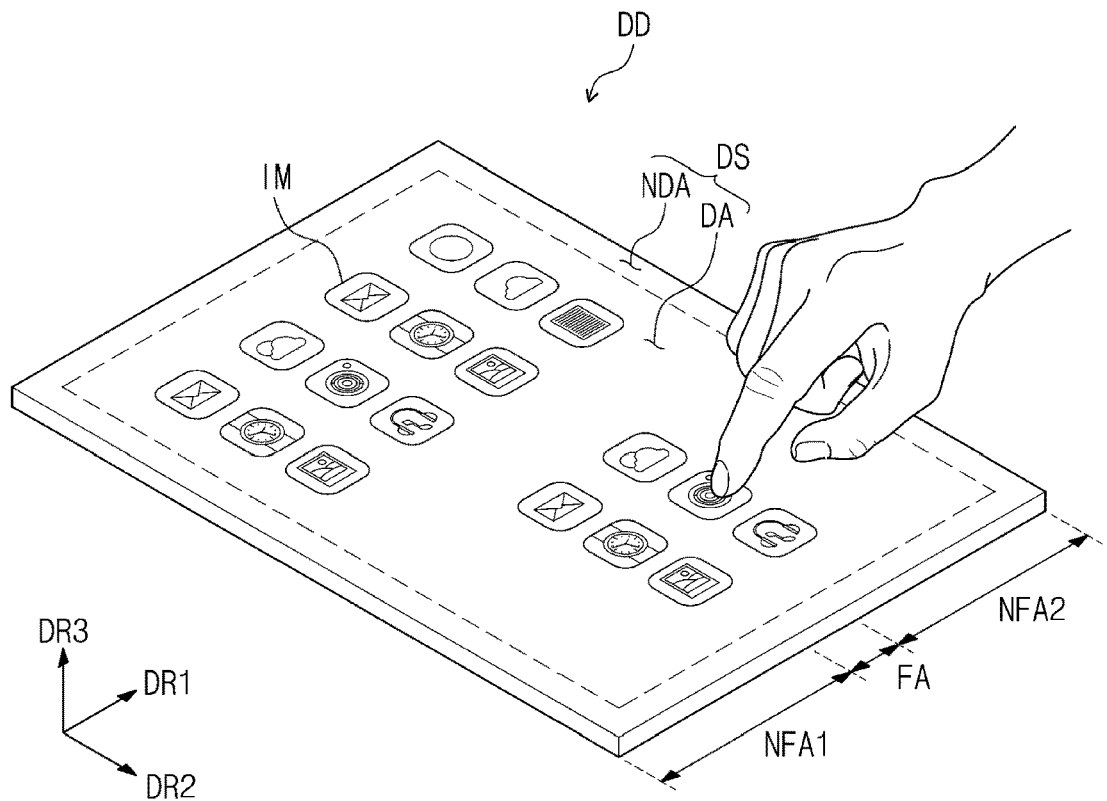
FIG. 1 is a perspective view showing a display device according to an embodiment.

In the disclosure, it will be understood that when an element or layer is referred to as being "on", "connected to" or "coupled to" another element or layer, it can be directly on, connected or coupled to the other element or layer or intervening elements or layers may be present. Conversely, when an element or layer is referred to as being "directly on" another element or layer, then intervening elements or layers may be absent therebetween. Furthermore, these terms may include positioning on or below an object and does not necessarily imply a direction based upon gravity.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element's or feature's relationship to another element(s) or feature(s) as illustrated in the figures. Furthermore, these terms do not necessarily imply a direction based upon gravity.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, embodiments will be explained in detail with reference to the accompanying drawings.

Figure 2:
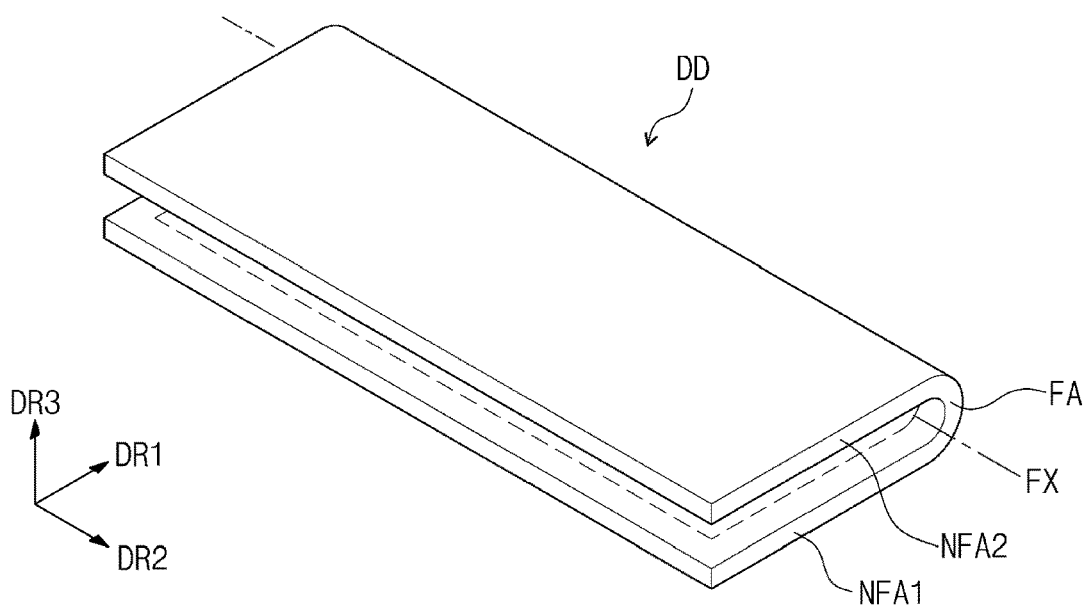
FIG. 2 is a view showing a folded state of the display device shown in FIG. 1.

FIG. 1 is a perspective view showing a display device DD according to an embodiment. FIG. 2 is a view showing a folded state of the display device DD shown in FIG. 1.

Referring to FIG. 1, the display device DD according to the embodiment of the disclosure may have a rectangular shape defined by long sides extending in a first direction DR1 and short sides extending in a second direction DR2 crossing the first direction DR1. However, the shape of the display device DD should not be limited to the rectangular shape, and the display device DD may have various shapes, such as a circular shape or a polygonal shape. The display device DD may be, but not limited to, a flexible display device.

Hereinafter, a direction substantially perpendicular to a plane defined by the first direction DR1 and the second direction DR2 may be referred to as a "third direction DR". In the disclosure, the expression "in a plan view" may mean a state of being viewed in the third direction DR3.

The display device DD may include a folding area FA and non-folding areas NFA1 and NFA2. The non-folding areas NFA1 and NFA2 may include a first non-folding area NFA1 and a second non-folding area NFA2. The folding area FA may be disposed between the first non-folding area NFA1 and the second non-folding area NFA2. The folding area FA, the first non-folding area NFA1, and the second non-folding area NFA2 may be arranged in the first direction DR1.

In the embodiment, one folding area FA and two non-folding areas NFA1 and NFA2 are shown as an example, however, the number of the folding areas FA and the number of non-folding areas NFA1 and NFA2 should not be limited thereto or thereby. For example, the display device DD may include more than two non-folding areas and folding areas disposed between the non-folding areas.

An upper surface of the display device DD may be referred to as a "display surface DS" and may be the plane surface defined by the first direction DR1 and the second direction DR2. Images IM generated by the display device DD may be provided to a user through the display surface DS.

The display surface DS may include a display area DA and a non-display area NDA around the display area DA. The display area DA displays the image, and the non-display area NDA does not display the image. The non-display area NDA surrounds the display area DA and defines an edge of the display device DD, which may be printed by a color.

Referring to FIG. 2, the display device DD may be, but not limited to, a foldable display device DD that is folded or unfolded. The folding area FA may be folded about a folding axis FX substantially parallel to the second direction DR2, and thus the display device DD may be folded. The folding axis FX may be defined as a long axis substantially parallel to the long sides of the display device DD.

When the display device DD is folded, the display device DD may be inwardly folded (in-folding) such that the first non-folding area NFA1 and the second non-folding area NFA2 face each other and the display surface DS is not exposed to the outside.

Figure 3:
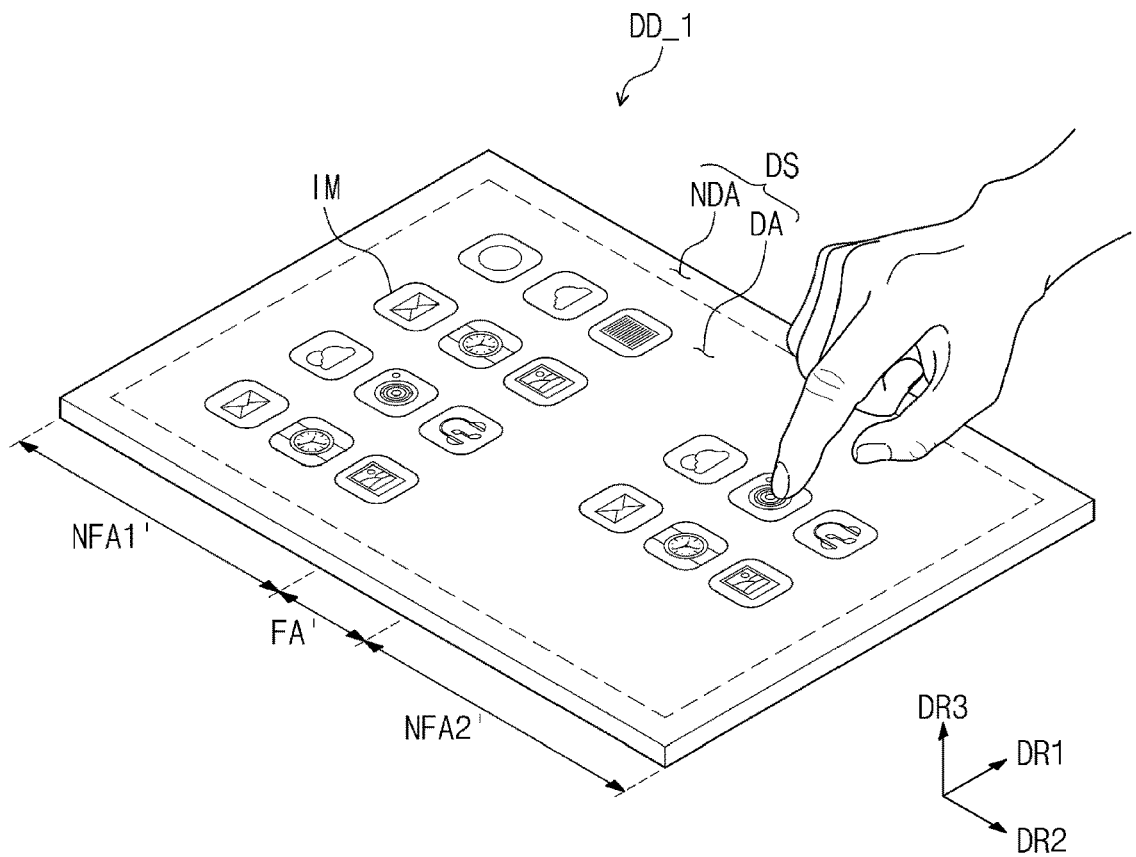
FIG. 3 is a perspective view showing a display device according to an embodiment.
Figure 4:
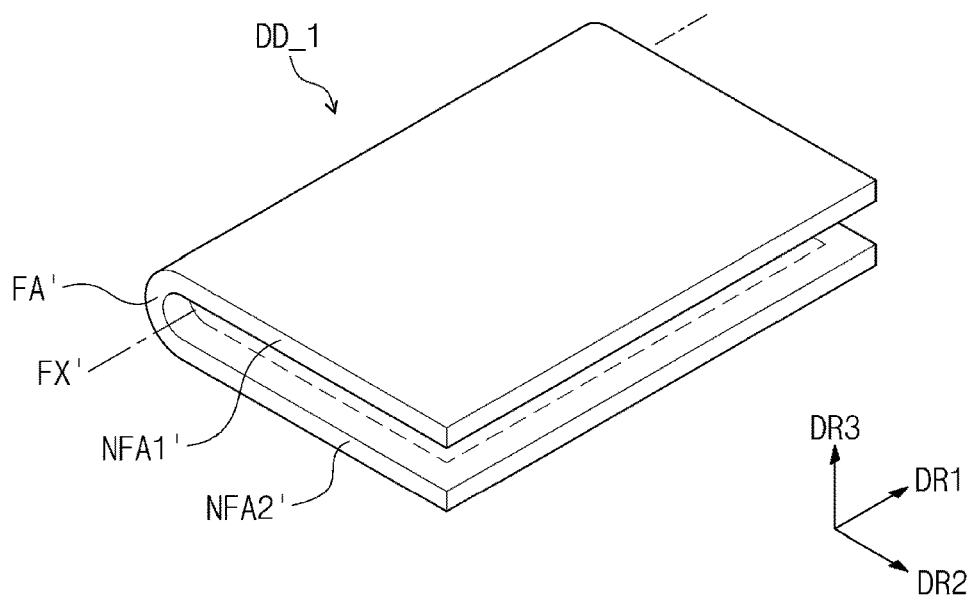
FIG. 4 is a view showing a folded state of the display device shown in FIG. 3.

FIG. 3 is a perspective view showing a display device DD_1 according to an embodiment. FIG. 4 is a view showing a folded state of the display device DD_1 shown in FIG. 3.

The display device DD_1 shown in FIG. 3 may have the same configurations as those of the display device DD shown in FIG. 1 except for a folding operation. Accordingly, the folding operation of the display device DD_1 will be mainly described.

Referring to FIGS. 3 and 4, the display device DD_1 may include a folding area FA' and non-folding areas NFA1' and NFA2'. The non-folding areas NFA1' and NFA2' may include a first non-folding area NFA1' and a second non-folding area NFA2'. The folding area FA' may be disposed between the first non-folding area NFA1' and the second non-folding area NFA2'. The folding area FA', the first non-folding area NFA1', and the second non-folding area NFA2' may be arranged in the second direction DR2.

The folding area FA' is folded about a folding axis FX' substantially parallel to the first direction DR1, and thus the display device DD_1 is folded. The folding axis FX' may be defined as a short axis substantially parallel to the short sides of the display device DD_1. The display device DD shown in FIG. 1 may be folded about the long axis, and the display device DD_1 shown in FIG. 3 may be folded about the short axis. The display device DD_1 may be inwardly folded (i.e., in-folding) such that the display surface DS is not exposed to the outside.

Hereinafter, the structure of the display device DD folded about the long axis will be described, however, structures described hereinafter may be applied to the display device DD_1 folded about the short axis.

Figure 5:
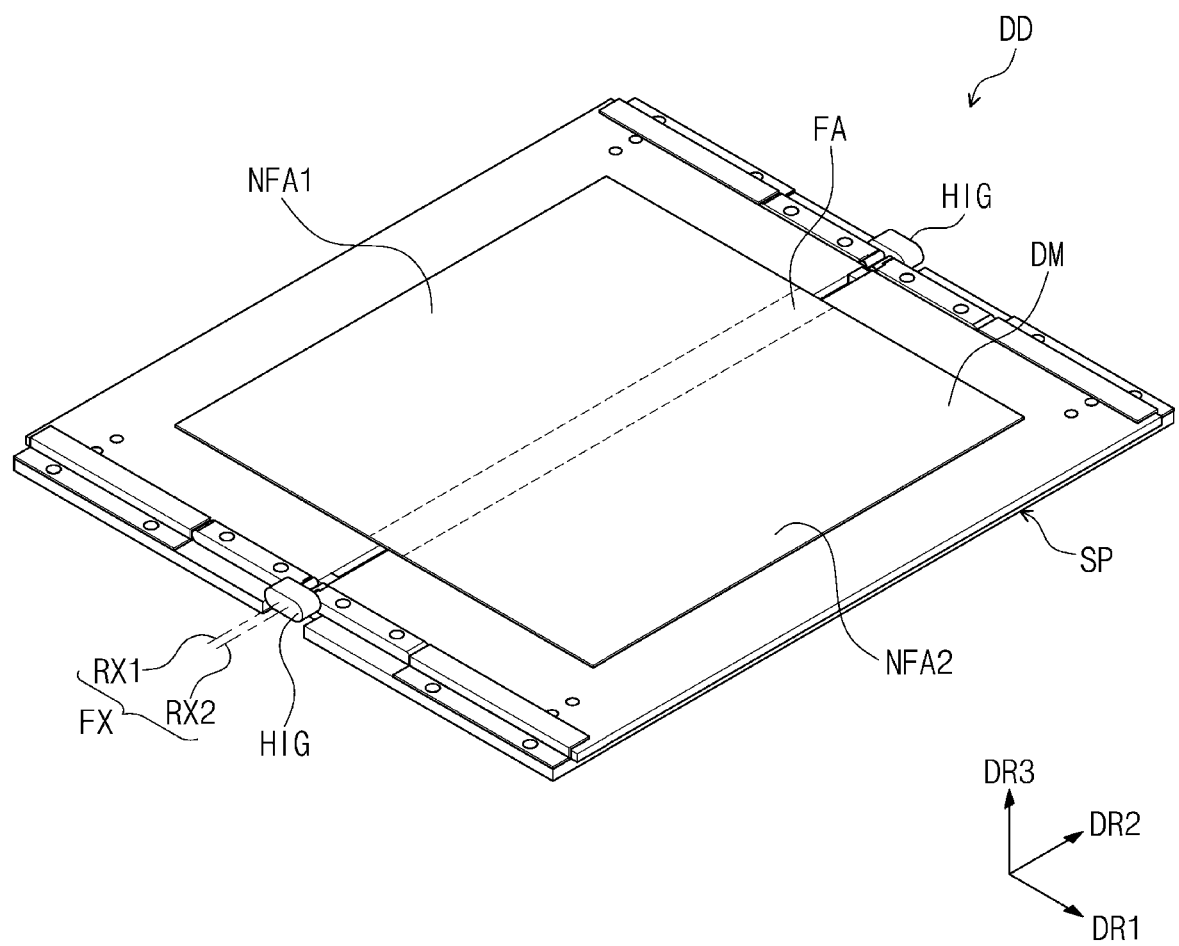
FIG. 5 is a perspective view showing a display device according to an embodiment.

FIG. 5 is a perspective view showing a display device according to an embodiment.

Referring to FIG. 5, the display device DD may include a display module DM, a supporter SP, and hinge parts HIG. The display module DM and the supporter SP may have a rectangular shape with short sides in the first direction DR1 and long sides in the second direction DR2. The display module DM may be, but not limited to, a flexible display module. The display module DM may include components and perform operations for the display device DD to display images.

The supporter SP may be disposed under the display module DM and may support the display module DM. The detailed configuration of the supporter SP will be described in detail below. The display module DM may be attached to the supporter SP by an adhesive. For example, the adhesive may be disposed between the display module DM and the supporter SP. The adhesive may be a pressure sensitive adhesive, but it should not be limited thereto or thereby.

The hinge parts HIG may be respectively disposed at both sides of the supporter SP, which are opposite to each other in the second direction DR2. As an example, two hinge parts HIG are shown, however, the number of the hinge parts HIG should not be limited to two. For instance, one hinge part HIG may be connected to a side among the second and third sides of the supporter SP, which are opposite to each other in the second direction DR2.

The hinge parts HIG may provide a folding axis FX extending in the second direction DR2 in the supporter SP. The hinge parts HIG may fold the supporter SP with respect to the folding axis FX. The display module DM may be folded due to the folding of the supporter SP.

The folding axis FX may include two rotational axes. For example, the folding axis FX may include a first rotation axis RX1 extending in the second direction DR2 and a second rotation axis RX2 extending in the second direction DR2 and spaced apart from the first rotation axis RX1 in the first direction DR1. The supporter SP may be folded by being rotated about the first and second rotation axes RX1 and RX2.

Figure 6:
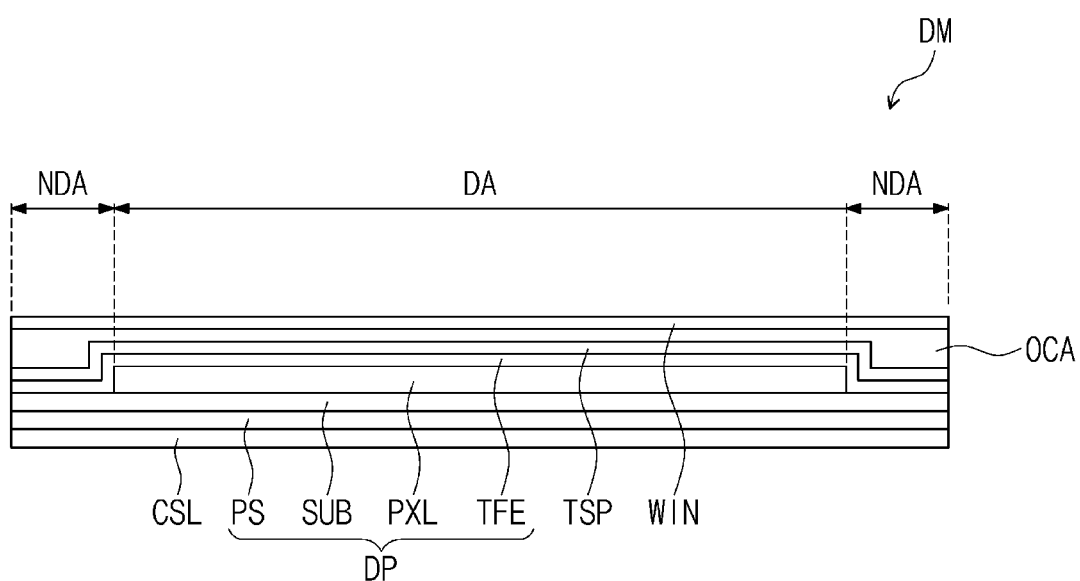
FIG. 6 is a cross-sectional view schematically showing a display module shown in FIG. 5.

FIG. 6 is a cross-sectional view schematically showing the display module DM shown in FIG. 5.

Referring to FIG. 6, the display module DM may include a display panel DP, an input sensing part TSP disposed on the display panel DP, a window WIN disposed on the input sensing part TSP, an adhesive OCA disposed between the input sensing part TSP and the window WIN, and a cushion layer CSL disposed under the display panel DP.

The display panel DP according to an embodiment may be a light emitting type display panel, although it should not be particularly limited to this type of display panel. For instance, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot or a quantum rod. Hereinafter, the organic light emitting display panel will be described as an example of the display panel DP.

The display panel DP may include a substrate SUB, a pixel layer PXL disposed on the substrate SUB, a thin film encapsulation layer TFE disposed on the substrate SUB to cover the pixel layer PXL, and a protective substrate PS disposed under the substrate SUB. The substrate SUB may include a flexible plastic substrate that is transparent. As an example, the substrate SUB may include polyimide (PI).

The substrate SUB may include a display area DA and a non-display area NDA around the display area DA as the display surface DS of the display device DD. The pixel layer PXL may be disposed on the display area DA. The pixel layer PXL may include multiple pixels, and each of the pixels may include a light emitting element.

The thin film encapsulation layer TFE may include at least two inorganic layers and an organic layer disposed between the inorganic layers. The inorganic layers may include an inorganic material and may protect the pixel layer PXL from moisture and oxygen. The organic layer may include an organic material and may protect the pixel layer PXL from a foreign substance such as dust particles.

The protective substrate PS may protect a lower portion of the substrate SUB. The protective substrate PS may include a flexible plastic substrate. As an example, the protective substrate PS may include polyethylene terephthalate (PET).

The input sensing part TSP may sense an external input (e.g., a user's touch), may convert the sensed input to an input signal, and may provide the input signal to the display panel DP. The input sensing part TSP may include touch sensor parts to sense the external input. The touch sensor parts may sense the external input by a capacitive method. The display panel DP may receive the input signal from the input sensing part TSP and may generate an image corresponding to the input signal.

The window WIN may protect the display panel DP and the input sensing part TSP from external scratches and impacts. The window WIN may be attached to the input sensing part TSP by the adhesive OCA. The adhesive OCA may include an optically clear adhesive. The image generated by the display panel DP may be provided to the user after passing through the window WIN.

The cushion layer CSL may absorb external impacts applied to the lower portion of the display module DM to protect the display panel DP. The cushion layer CSL may include a foam sheet having an elasticity.

Figure 7:
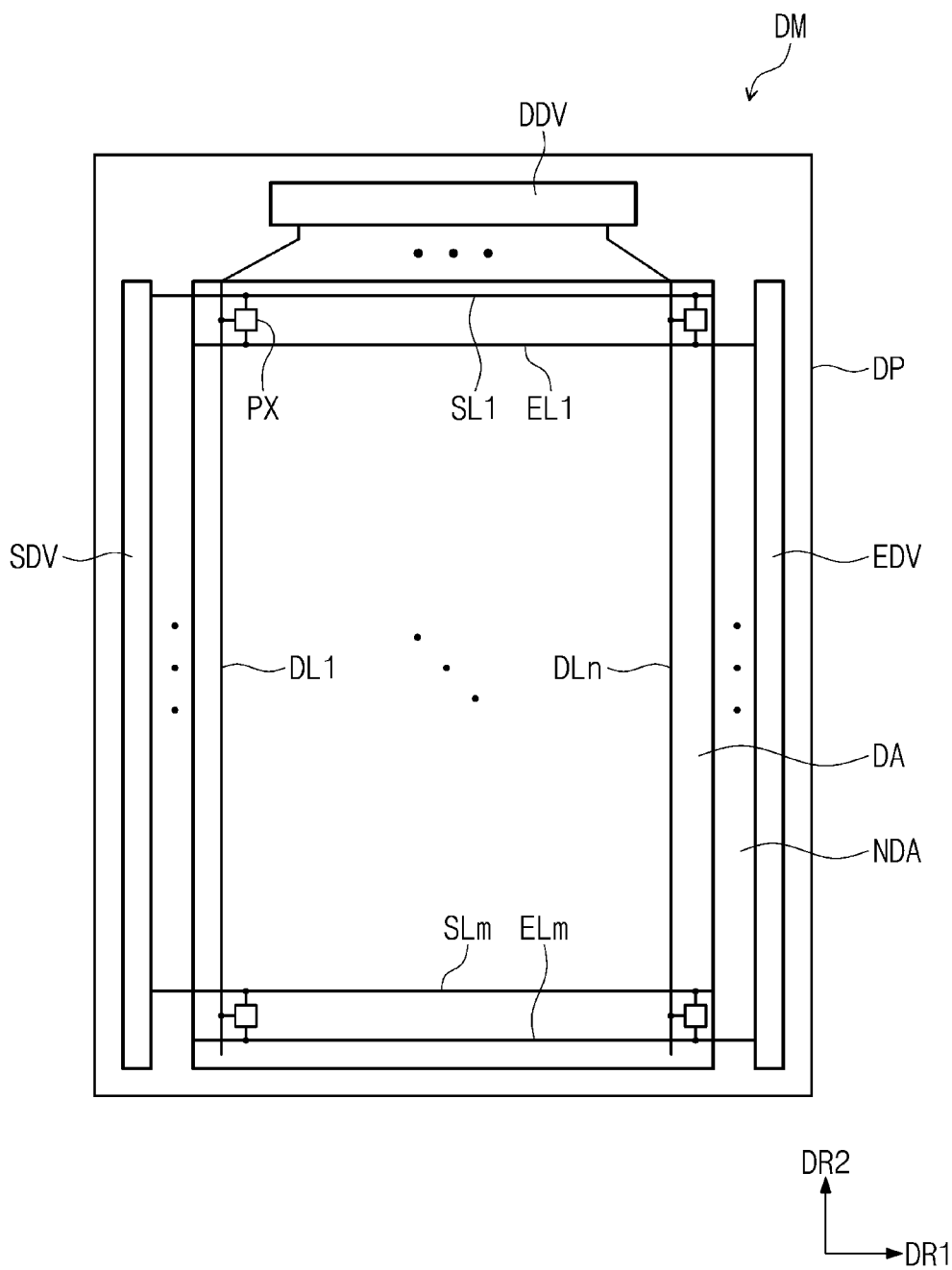
FIG. 7 is a plan view showing the display module shown in FIG. 6.

FIG. 7 is a plan view showing the display module DM shown in FIG. 6.

Referring to FIG. 7, the display module DM may include the display panel DP, a scan driver SDV, a data driver DDV, and an emission driver EDV. FIG. 7 shows a configuration of the display panel DP in a plan view, and the planar configuration of the input sensing part TSP is omitted.

The display panel DP may be a flexible display panel. For example, the display panel DP may include electronic elements disposed on a flexible substrate. The display panel DP may have a rectangular shape defined by short sides extending in the first direction DR1 and long sides extending in the second direction DR2. The display panel DP may include a display area DA and a non-display area NDA surrounding the display area DA as the display surface DS of the display device DD.

The display panel DP may include pixels PX, scan lines SL1 to SLm, data lines DL1 to DLn, and light emitting lines EL1 to ELm. Each of "m" and "n" is a natural number. The pixels PX may be arranged in a matrix form, however, they should not be limited thereto or thereby. The pixels PX may be arranged in the display area DA and may be connected to the scan lines SL1 to SLM, the data lines DL1 to DLn, and the light emitting lines EL1 to ELm.

The scan driver SDV, the data driver DDV, and the emission driver EDV may be arranged in the non-display area NDA. The scan driver SDV and the emission driver EDV may be disposed to be respectively adjacent to the long sides of the display panel DP. The data driver DDV may be in an integrated circuit chip form and may be disposed to be adjacent to one short side of the short sides of the display panel DP.

However, the data driver DDV may be mounted on a flexible circuit board connected to the display panel DP. The data driver DDV may be connected to the display panel DP via the flexible circuit board.

The scan lines SL1 to SLm may extend in the first direction DR1 and may be connected to the scan driver SDV. The data lines DL1 to DLn may extend in the second direction DR2 and may be connected to the data driver DDV. The light emitting lines EL1 to ELm may extend in the first direction DR1 and may be connected to the emission driver EDV.

The scan driver SDV may generate scan signals, and the scan signals may be applied to the pixels PX through the scan lines SL1 to SLm. The scan signals may be sequentially applied to the pixels PX. The data driver DDV may generate data voltages, and the data voltages may be applied to the pixels PX through the data lines DL1 to DLn. The emission driver EDV may generate light emitting signals, and the light emitting signals may be applied to the pixels PX through the light emitting lines EL1 to ELm.

The display module DM may include a timing controller to control an operation of the scan driver SDV, the data driver DDV, and the emission driver EDV.

The timing controller may generate a scan control signal, a data control signal, and a light emitting control signal in response to control signals applied thereto from the outside. The timing controller may receive image signals from the outside, may convert a data format of the image signals according to an interface with the data driver DDV, and may provide the converted image signals to the data driver DDV.

The scan driver SDV may generate the scan signals in response to the scan control signal, and the emission driver EDV may generate the light emitting signals in response to the light emitting control signal. The data driver DDV may receive the image signals whose data format is converted and may generate data voltages corresponding to the image signals in response to the data control signal.

The pixels PX may receive the data voltages in response to the scan signals. The pixels PX may emit light having luminance corresponding to the data voltages in response to the light emitting signals to display the image. A light emitting time of the pixels PX may be controlled by the light emitting signals.

Figure 8:
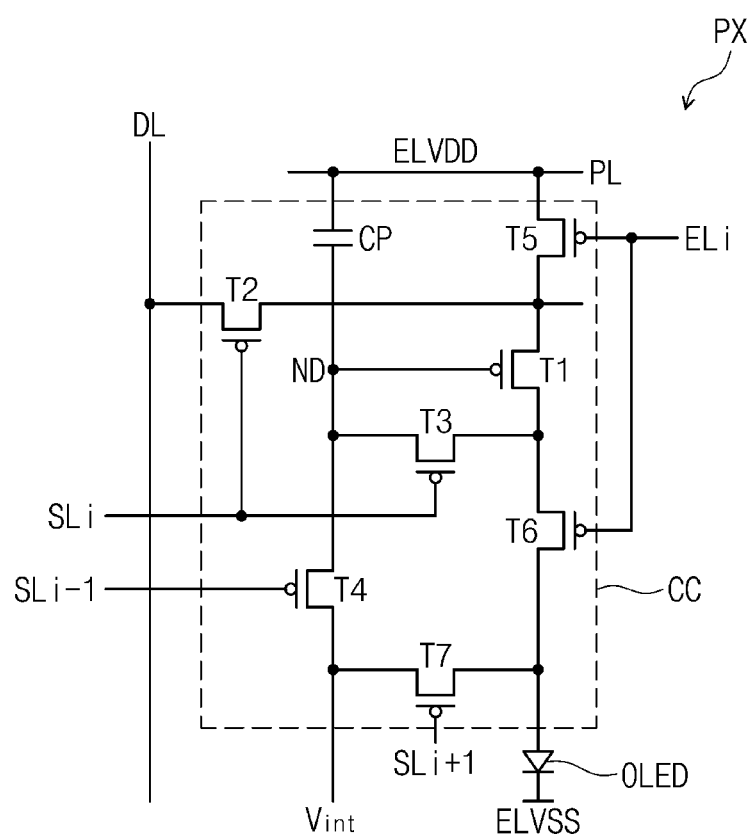
FIG. 8 is an equivalent circuit schematic diagram showing a pixel shown in FIG. 7.

FIG. 8 is an equivalent circuit schematic diagram showing the pixel shown PX in FIG. 7.

Referring to FIG. 8, the pixel PX may include a light emitting element OLED and a pixel circuit CC. The pixel circuit CC may include transistors T1 to T7 and a capacitor CP. The pixel circuit CC may control an amount of current flowing through the light emitting element OLED in response to the data voltage.

The light emitting element OLED may emit a light at a luminance in response to the amount of current provided from the pixel circuit CC. To this end, a level of a first voltage ELVDD may be set higher than a level of a second voltage ELVSS.

Each of the transistors T1 to T7 may include an input electrode (or source electrode), an output electrode (or drain electrode), and a control electrode (or gate electrode). In the following descriptions, for the convenience of explanation, one electrode of the input electrode and the output electrode may be referred to as a "first electrode", and the other electrode of the input electrode and the output electrode may be referred to as a "second electrode".

A first electrode of a first transistor T1 may be connected to a power line PL to which the first voltage ELVDD is applied via a fifth transistor T5, and a second electrode of the first transistor T1 may be connected to an anode electrode of the light emitting element OLED via a sixth transistor T6. The first transistor T1 may be referred to as a "driving transistor" in the disclosure. The first transistor T1 may control the amount of current flowing through the light emitting element OLED in response to a voltage applied to a control electrode of the first transistor T1.

A second transistor T2 may be connected between the data line DL and the first electrode of the first transistor T1, and a control electrode of the second transistor T2 may be connected to an i-th scan line SLi. The second transistor T2 may be turned on in response to an i-th scan signal Si applied thereto via the i-th scan line SLi and may electrically connect the data line DL to the first electrode of the first transistor T1.

A third transistor T3 may be connected between the second electrode of the first transistor T1 and the control electrode of the first transistor T1. A control electrode of the third transistor T3 may be connected to the i-th scan line SLi. The third transistor T3 may be turned on in response to the i-th scan signal Si applied thereto via the i-th scan line SLi and may electrically connect the second electrode of the first transistor T1 to the control electrode of the first transistor T1. When the third transistor T3 is turned on, the first transistor T1 may be connected in a diode configuration.

A fourth transistor T4 may be connected between a node ND and an initialization power generator. A control electrode of the fourth transistor T4 may be connected to an (i−1)th scan line SLi−1. The fourth transistor T4 may be turned on in response to an (i−1)th scan signal Si−1 applied thereto via the (i−1)th scan line SLi−1 and may provide an initialization voltage Vint to the node ND.

The fifth transistor T5 may be connected between the power line PL and the first electrode of the first transistor T1.

A control electrode of the fifth transistor T5 may be connected to an i-th light emitting line ELi.

The sixth transistor T6 may be connected between the second electrode of the first transistor T1 and the anode electrode of the light emitting element OLED. A control electrode of the sixth transistor T6 may be connected to the i-th light emitting line ELi.

A seventh transistor T7 may be connected between the initialization power generator and the anode electrode of the light emitting element OLED. A control electrode of the seventh transistor T7 may be connected to an (i+1)th scan line SLi+1. The seventh transistor T7 may be turned on in response to an (i+1)th scan signal Si+1 applied thereto via the (i+1)th scan line SLi+1 and may provide the initialization voltage Vint to the anode electrode of the light emitting element OLED.

The capacitor CP may be disposed between the power line PL and the node ND. The capacitor CP may be charged with the data voltage. When the fifth and sixth transistors T5 and T6 are turned on due to the voltage charged in the capacitor CP, the amount of the current flowing through the first transistor T1 may be determined.

FIG. 8 illustrates a PMOS as an example of the transistors T1 to T7, however, the transistors T1 to T7 should not be limited to the PMOS. According to another embodiment, the transistors T1 to T7 may be implemented by an NMOS.

Figure 9:
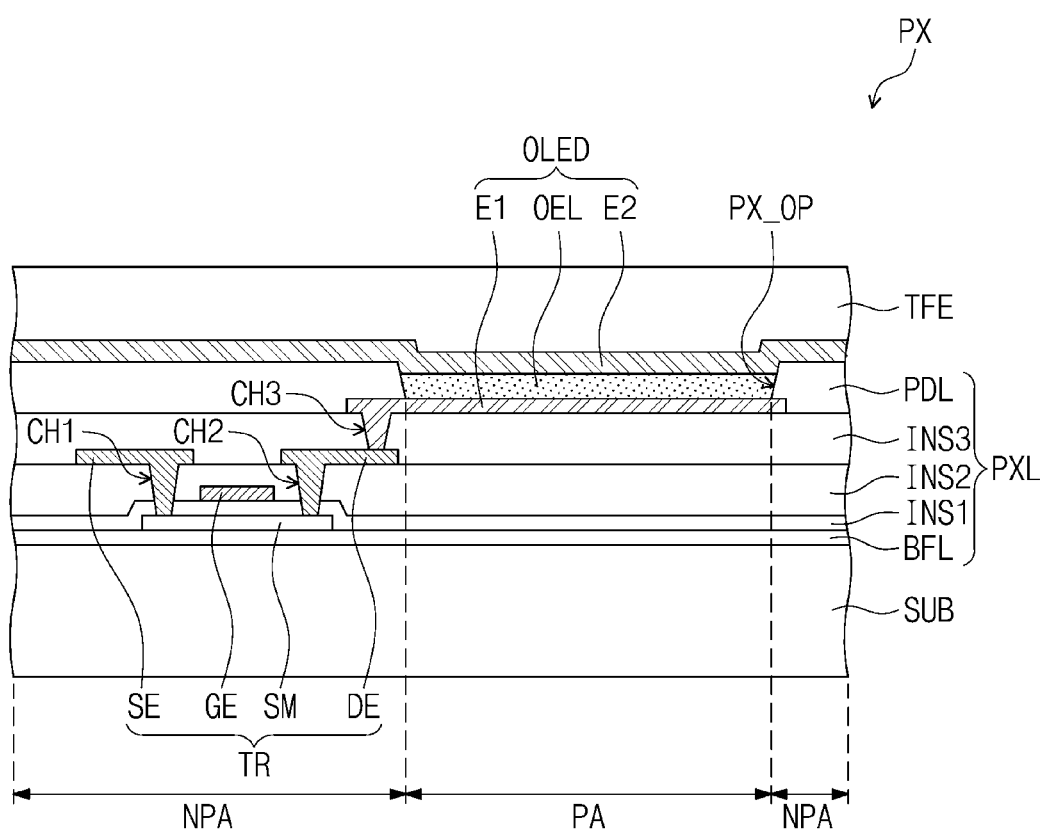
FIG. 9 is a cross-sectional view showing a portion corresponding to a light emitting element shown in FIG. 8.

FIG. 9 is a cross-sectional view showing a portion corresponding to the light emitting element shown in FIG. 8.

Referring to FIG. 9, the pixel PX may include the light emitting element OLED and the transistor TR connected to the light emitting element OLED. The light emitting element OLED may include a first electrode E1, a second electrode E2, and an organic light emitting layer OEL disposed between the first electrode E1 and the second electrode E2. The transistor TR may be the sixth transistor T6 shown in FIG. 8. The light emitting element OLED may be an organic light emitting element.

The first electrode E1 may be the anode electrode, and the second electrode E2 may be a cathode electrode. The first electrode E1 may be referred to as a "pixel electrode", and the second electrode E2 may be referred to as a "common electrode".

The pixel PX may include a pixel area PA and a non-pixel area NPA around the pixel area PA. The light emitting element OLED may be disposed in the pixel area PA, and the transistor TR may be disposed in the non-pixel area NPA.

The transistor TR and the light emitting element OLED may be disposed on the substrate SUB. A buffer layer BFL may be disposed on the substrate SUB, and the buffer layer BFL may include an inorganic material.

A semiconductor layer SM of the transistor TR may be disposed on the buffer layer BFL. The semiconductor layer SM may include an inorganic semiconductor, such as amorphous silicon or polycrystalline silicon, or an organic semiconductor. In addition, the semiconductor layer SM may include an oxide semiconductor. The semiconductor layer SM may include a source area, a drain area, and a channel area defined between the source area and the drain area.

A first insulating layer INS1 may be disposed on the buffer layer BFL to cover the semiconductor layer SM. The first insulating layer INS1 may include an inorganic material. A gate electrode GE of the transistor TR may be disposed on the first insulating layer INS1 to overlap the semiconductor layer SM. The gate electrode GE may be disposed to overlap the channel area of the semiconductor layer SM.

A second insulating layer INS2 may be disposed on the first insulating layer INS1 to cover the gate electrode GE. The second insulating layer INS2 may include an organic material and/or an inorganic material.

A source electrode SE and a drain electrode DE of the transistor TR may be disposed on the second insulating layer INS2 to be spaced apart from each other. The source electrode SE may be connected to the source area of the semiconductor layer SM through a first contact hole CH1 defined through the first insulating layer INS1 and the second insulating layer INS2. The drain electrode DE may be connected to the drain area of the semiconductor layer SM through a second contact hole CH2 defined through the first insulating layer INS1 and the second insulating layer INS2.

A third insulating layer INS3 may be disposed on the second insulating layer INS2 to cover the source electrode SE and the drain electrode DE of the transistor TR. The third insulating layer INS3 may be referred to as a planarization layer that provides a flat upper surface and may include an organic material.

The first electrode E1 may be disposed on the third insulating layer INS3. The first electrode E1 may be connected to the drain electrode DE of the transistor TR through a third contact hole CH3 defined through the third insulating layer INS3.

A pixel definition layer PDL may be disposed on the first electrode E1 and the third insulating layer INS3 to expose a portion of the first electrode E1. A pixel opening PX_OP may be defined in the pixel definition layer PDL to expose the portion of the first electrode E1.

The organic light emitting layer OEL may be disposed on the first electrode E1 in the pixel opening PX_OP. The organic light emitting layer OEL may generate a light having one of red, green, and blue colors, however, it should not be limited thereto or thereby. The organic light emitting layer OEL may generate a white light by a combination of organic materials respectively generating the red, green, and blue colors.

The second electrode E2 may be disposed on the pixel definition layer PDL and the organic light emitting layer OEL. The thin film encapsulation layer TFE may be disposed on the light emitting element OLED to cover the pixel PX. A layer disposed between the substrate SUB and the thin film encapsulation layer TFE may be referred to as the pixel layer PXL.

The first voltage ELVDD may be applied to the first electrode E1, and the second voltage ELVSS may be applied to the second electrode E2. Holes and electrons injected into the organic light emitting layer OEL are recombined to generate excitons, and the light emitting element OLED emits the light by the excitons that return to a ground state from an excited state. The light emitting element OLED may emit red, green, and blue lights in accordance with the current flow, so that the image may be displayed.

Figure 10:
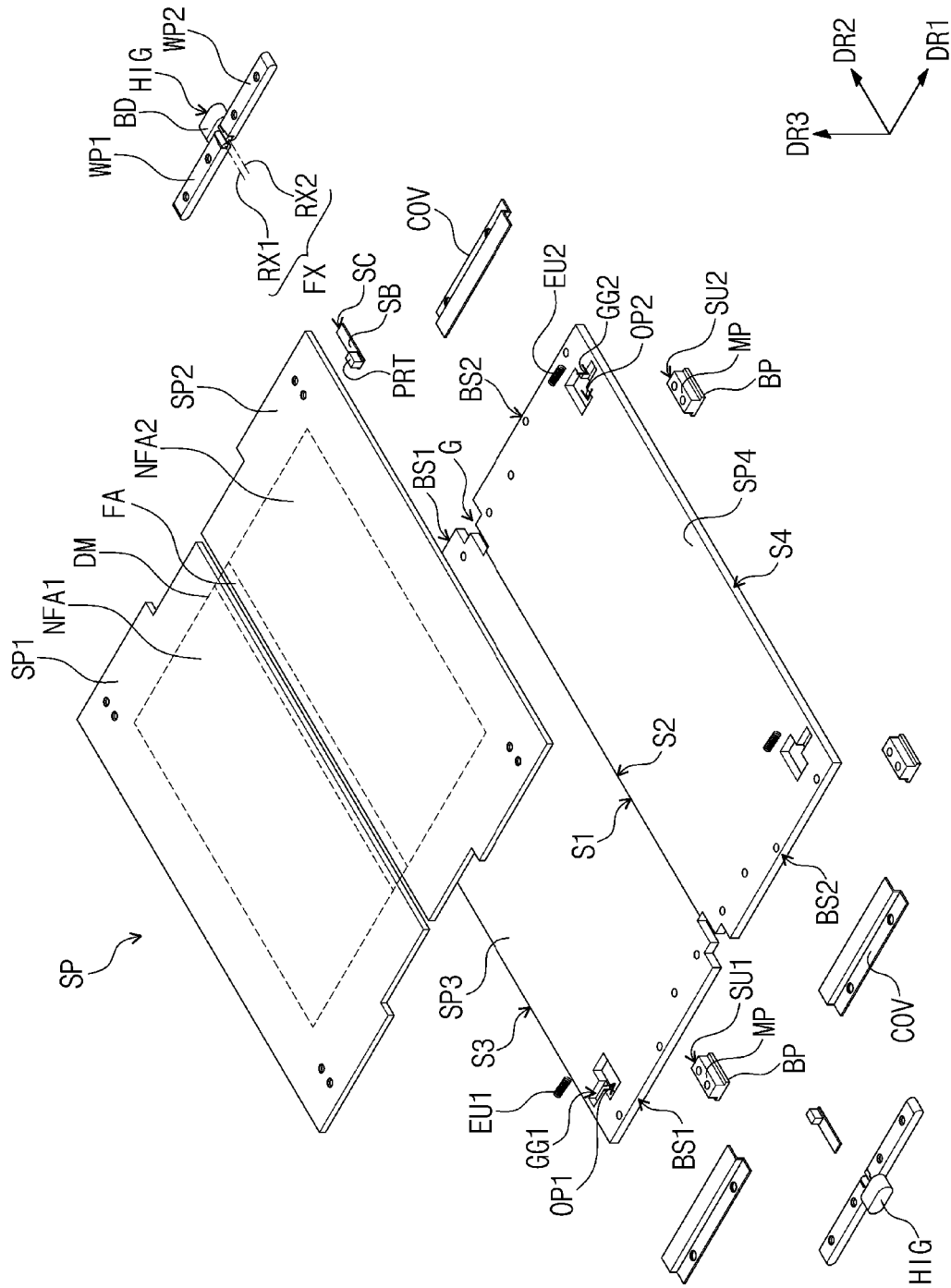
FIG. 10 is an exploded perspective view showing a supporter of a display device according to an embodiment.

FIG. 10 is an exploded perspective view showing a supporter of a display device according to an embodiment, for example, the supporter SP shown in FIG. 5.

For the convenience of explanation, an area in which the display module DM is disposed is indicated by a dotted line in FIG. 10.

Referring to FIG. 10, the supporter SP may include a first supporter SP1, a second supporter SP2, a third supporter SP3, a fourth supporter SP4, spacers SC, sliding parts SU1 and SU2, elastic parts EU1 and EU2, and cover parts COV.

The first, second, third, and fourth supporters SP1, SP2, SP3, and SP4 may include a plane defined by the first and second directions DR1 and DR2. The first supporter SP1 and the second supporter SP2 may be arranged in the first direction DR1. The third supporter SP3 and the fourth supporter SP4 may be arranged in the first direction DR1.

The first and second supporters SP1 and SP2 may be disposed under the display module DM to support the display module DM. The first supporter SP1 may be disposed under the first non-folding area NFA1. The second supporter SP2 may be disposed under the second non-folding area NFA2.

The third and fourth supporters SP3 and SP4 may be disposed under the first and second supporters SP1 and SP2. The third supporter SP3 may be disposed under the first supporter SP1, and the fourth supporter SP4 may be disposed under the second supporter SP2.

A first side S1 of the third supporter SP3 and a first side S2 of the fourth supporter SP4 may face each other in the first direction DR1. A distal side S3 of the third supporter SP3 may be opposite to the first side S1 of the third supporter SP3. A distal side S4 of the fourth supporter SP4 may be opposite to the first side S2 of the fourth supporter SP4. The distal sides S3 and S4 of the third and fourth supporters SP3 and SP4 may define exteriors of the third and fourth supporters SP3 and SP4, which are disposed opposite to each other in the first direction DR1.

Openings OP1 and OP2 may be defined in the third and fourth supporters SP3 and SP4. The openings OP1 and OP2 may be defined adjacent to the distal side S3 of the third supporter SP3 and the distal side of the fourth supporter SP4. The openings OP1 and OP2 may include first openings OP1 defined in (or through) the third supporter SP3 and second openings OP2 defined in (or through) the fourth supporter SP4. The first openings OP1 may be defined adjacent to the distal side S3 of the third supporter SP3, and the second openings OP2 may be defined adjacent to the distal side S4 of the fourth supporter SP4.

Guide grooves GG1 and GG2 may extend from the openings OP1 and OP2 in the first direction DR1 and may be defined in the third and fourth supporters SP3 and SP4. The guide grooves GG1 and GG2 may extend toward distal portions of the third and fourth supporters SP3 and SP4 from the openings OP1 and OP2. For example, the guide grooves GG1 and GG2 may extend to the distal side S3 of the third supporter SP3 and the distal side S4 of the fourth supporter SP4 from the openings OP1 and OP2.

The guide grooves GG1 and GG2 may include first guide grooves GG1 defined in the third supporter SP3 and second guide grooves GG2 defined in the fourth supporter SP4. The first guide grooves GG1 may extend toward the distal side S3 of the third supporter SP3 from the first openings OP1 in the first direction DR1. The second guide grooves GG2 may extend toward the distal side S4 of the fourth supporter SP4 from the second openings OP2 in the first direction DR1.

The first guide grooves GG1 may be defined between the first openings OP1 and the distal side S3 of the third supporter SP3. For example, the first guide grooves GG1 may be defined adjacent to the distal side S3 of the third support part SP3 without passing through the distal side S3 of the third supporter SP3. The second guide grooves GG2 may be defined between the second openings OP2 and the distal side S4 of the fourth supporter SP4. For example, the second guide grooves GG2 may be defined adjacent to the distal side S4 of the fourth support part SP4 without passing through the distal side S4 of the fourth supporter SP4.

Figure 11:
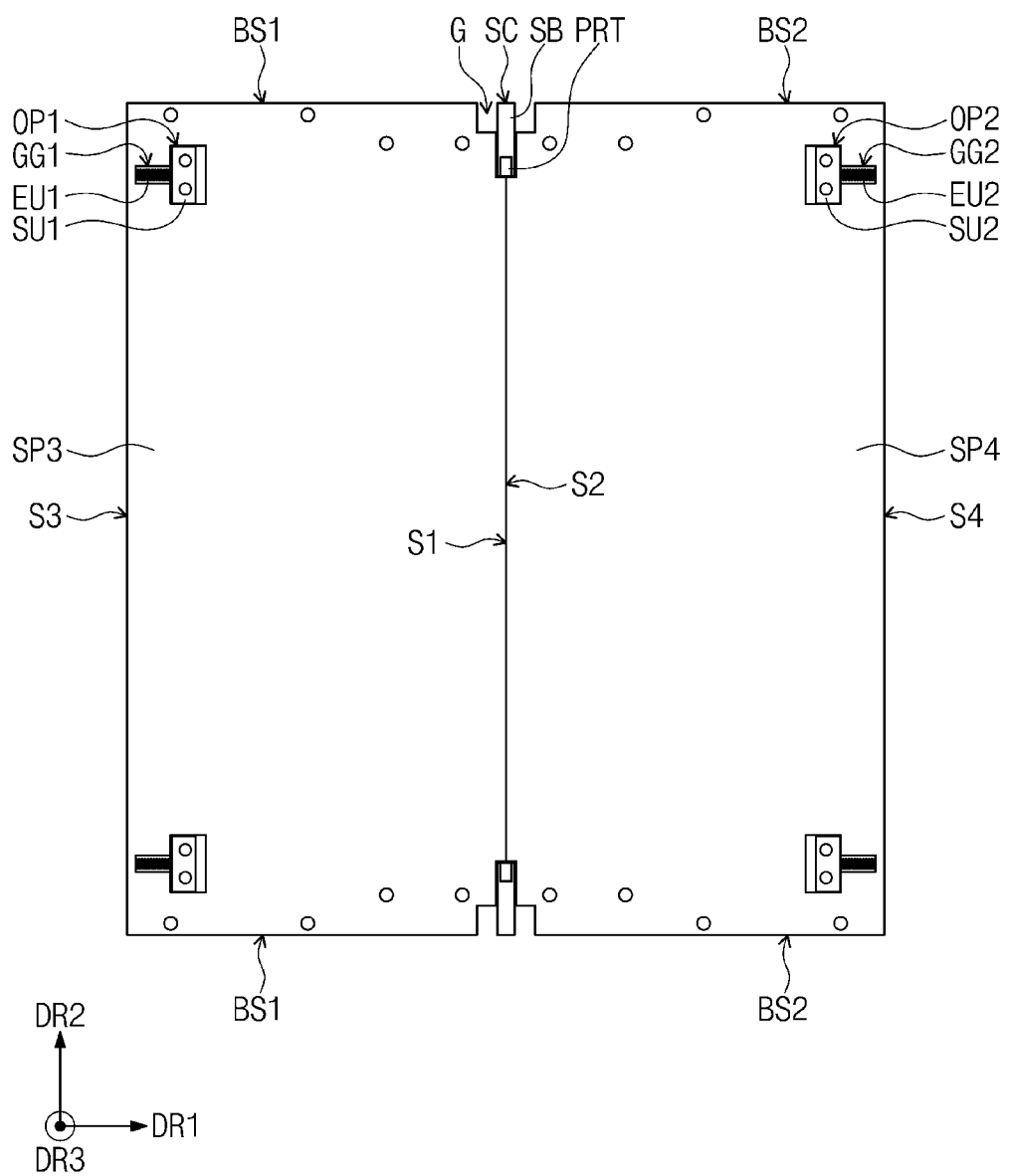
FIG. 11 is a plan view showing a structure in which sliding parts, elastic parts, and spacers are arranged in third and fourth supporters shown in FIG. 10.

The sliding parts SU1 and SU2 may be disposed in the openings OP1 and OP2. The sliding parts SU1 and SU2 may include first sliding parts SU1 disposed in the first openings OP1 and second sliding parts SU2 disposed in the second openings OP2. A structure in which the sliding parts SU1 and SU2 are disposed in the openings OP1 and OP2 is shown in FIG. 11. Each of the first and second sliding parts SU1 and SU2 may include a bottom portion BP and a moving portion MP extending upward from the bottom portion BP.

The elastic parts EU1 and EU2 may be disposed in the guide grooves GG1 and GG2. The elastic parts EU1 and EU2 may include first elastic parts EU1 disposed in the first guide grooves GG1 and second elastic parts EU2 disposed in the second guide grooves GG2. A structure in which the elastic parts EU1 and EU2 are disposed in the guide grooves GG1 and GG2 is shown in FIG. 11.

Grooves G may be defined in second and third sides BS1 of the third supporter SP3 and second and third sides BS2 of the fourth supporter SP4, which are opposite to each other in the second direction DR2. Where the third and fourth supporters SP3 and SP4 are one support plate, the grooves G may be defined at a center portion of each of the second and third sides of the support plate, which are opposite to each other in the second direction DR2.

The grooves G may be defined at portions where the first side Si of the third supporter SP3 is connected to the second and third sides BS1 of the third supporter SP3, which are opposite to each other in the second direction DR2, and portions where the first side S2 of the fourth supporter SP4 is connected to the second and third sides BS2 of the fourth supporter SP4, which are opposite to each other in the second direction DR2. Thus, the grooves G may be defined between the second and third sides BS1 of the third supporter SP3 and the second and third sides BS2 of the fourth supporter SP4. As an example, the grooves G may be defined in a stepped shape.

The spacers SC may be disposed in the grooves G. The structure in which the spacers SC are disposed in the grooves G is shown in FIG. 11. Two spacers SC are shown as an example, however, the number of the spacers SC should not be limited thereto or thereby. For example, at least one spacer SC may be provided in the display device DD. Each of the spacers SC may include a support bar SB extending in the second direction DR2 and a protrusion PRT protruding upward from the support bar SB. The protrusion PRT may protrude from an end of the support bar SB.

The hinge parts HIG may be connected to portions of the third and fourth supporters SP3 and SP4 adjacent to the second and third sides BS1 and BS2 of the third and fourth supporters SP3 and SP4. The structure described above is shown in detail with reference to FIG. 16.

Each of the hinge parts HIG may include a body portion BD, a first wing portion WP1 connected to the body portion BD, and a second wing portion WP2 connected to the body portion BD. The first and second wing portions WP1 and WP2 may be respectively connected to both sides of the body portion BD, which are opposite to each other in the first direction DR1. The first and second wing portions WP1 and WP2 may extend in the first direction DR1 and may be arranged in the first direction DR1.

A first side of the first wing portion WP1 and a first side of the second wing portion WP2, which face each other in the first direction DR1, may be connected to the body portion BD to be rotatable. The hinge parts HIG may define the first rotation axis RX1 extending from a second side of the first wing portion WP1 in the second direction DR2 and the second rotation axis RX2 extending from a second side of the second wing portion WP2 in the second direction DR2.

The cover parts COV may have a stepped shape. The cover parts COV may be connected to the third and fourth supporters SP3 and SP4, and this structure will be described in detail later with reference to FIG. 19.

Hereinafter, connection relationships between the components of the supporter SP shown in FIG. 10 will be described with reference to FIGS. 11 to 19. For the convenience of explanation, FIGS. 11, 12, 16, and 19 show plan views.

FIG. 11 is a plan view showing a structure in which the sliding parts SU1 and SU2, the elastic parts EU1 and EU2, and the spacers SC are arranged in the third and fourth supporters SP3 and SP4 shown in FIG. 10.

Referring to FIG. 11, the sliding parts SU1 and SU2 may be inserted into the openings OP1 and OP2 and may be respectively disposed in the openings OP1 and OP2. The first sliding parts SU1 may be inserted into the first openings OP1 and may be respectively disposed in the first openings OP1. The second sliding parts SU2 may be inserted into the second openings OP2 and may be respectively disposed in the second openings OP2.

The elastic parts EU1 and EU2 may be respectively disposed in the guide grooves GG1 and GG2. Accordingly, the elastic parts EU1 and EU2 may be disposed between the distal sides S3 and S4 of the third and fourth supporters SP3 and SP4 and the sliding parts SU1 and SU2.

The first elastic parts EU1 may be respectively disposed in the first guide grooves GG1. Therefore, the first elastic parts EU1 may be disposed between the distal side S3 of the third supporter SP3 and the first sliding parts SU1. The second elastic parts EU2 may be respectively disposed in the second guide grooves GG2. Therefore, the second elastic parts EU2 may be disposed between the distal side S4 of the fourth supporter SP4 and the second sliding parts SU2.

The elastic parts EU1 and EU2 may contact the sliding parts SU1 and SU2, which face distal sides S3 and S4 of the third and fourth supporters SP3 and SP4. In detail, the first elastic parts EU1 may contact the first sliding parts SU1, which is medial to the distal side S3 of the third supporter SP3. The second elastic parts EU2 may contact the second sliding parts SU2, which is medial to the distal side S4 of the fourth supporter SP4.

The spacers SC may be arranged in the second direction DR2 and may be respectively disposed in the grooves G. The protrusions PRT may be disposed in the grooves G that are relatively narrower in the first direction DR1 among the grooves G having the stepped shape.

Figure 12:
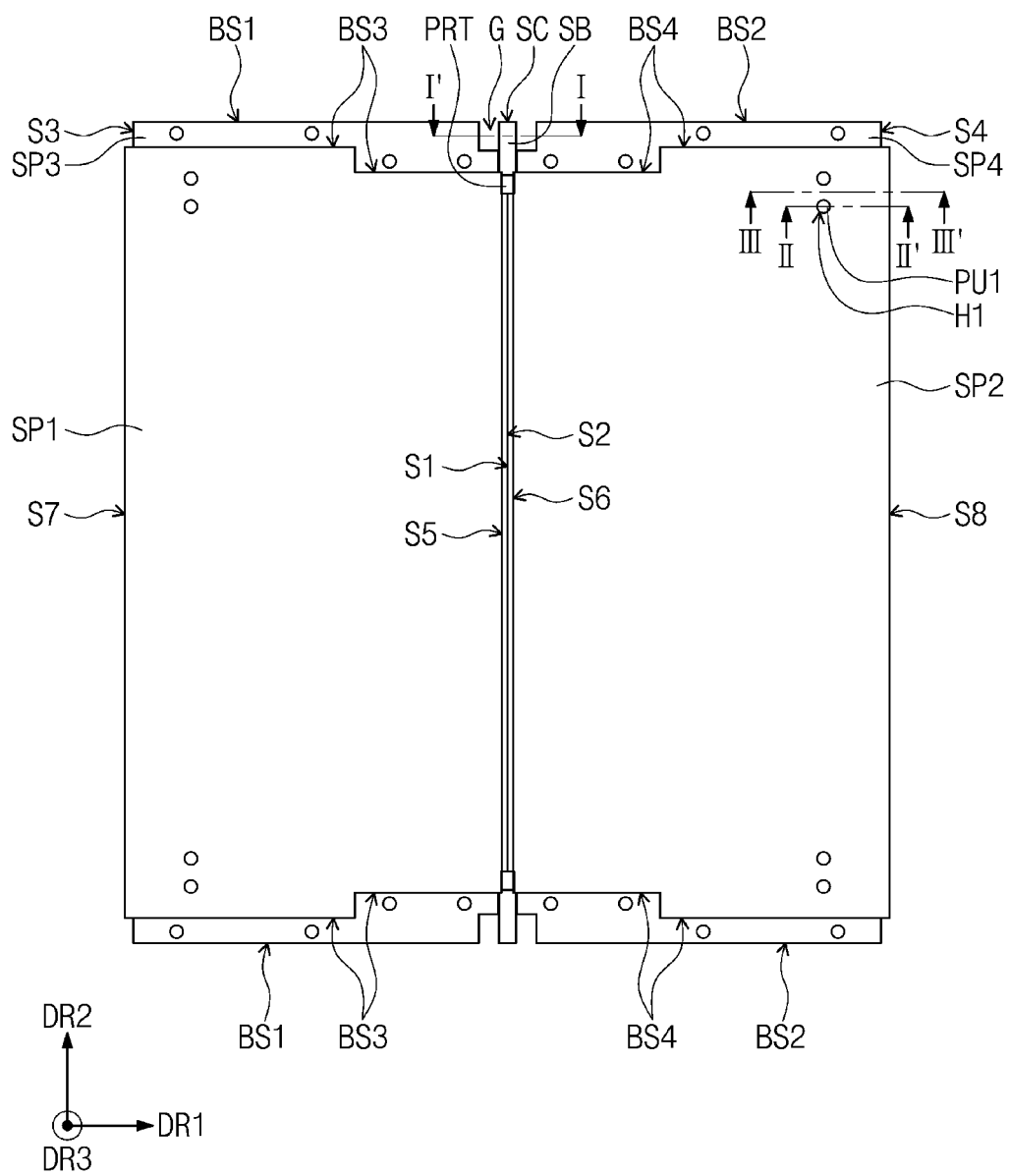
FIG. 12 is a plan view showing a structure in which first and second supporters are disposed on the third and fourth supporters shown in FIG. 10.
Figure 13:
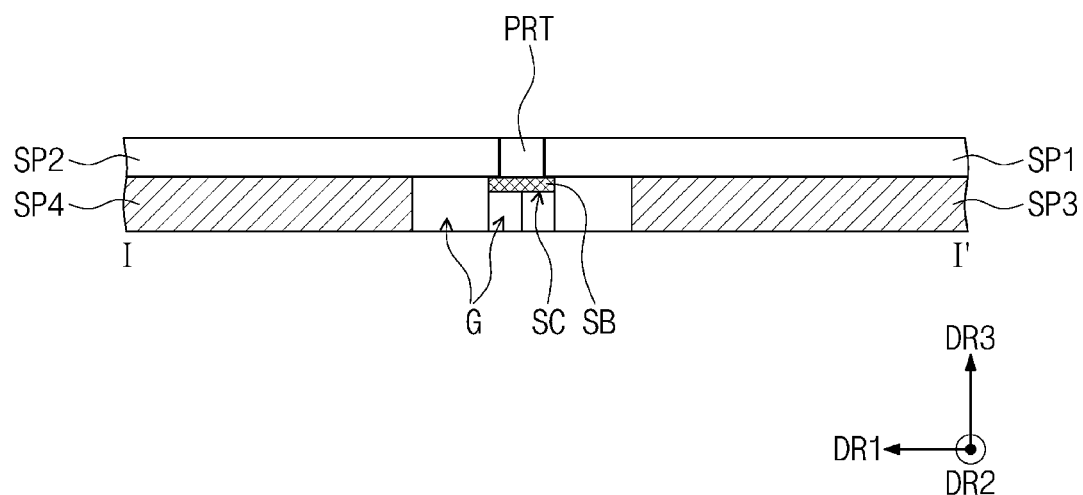
FIG. 13 is a cross-sectional view taken along line I-I' shown in FIG. 12.
Figure 14:
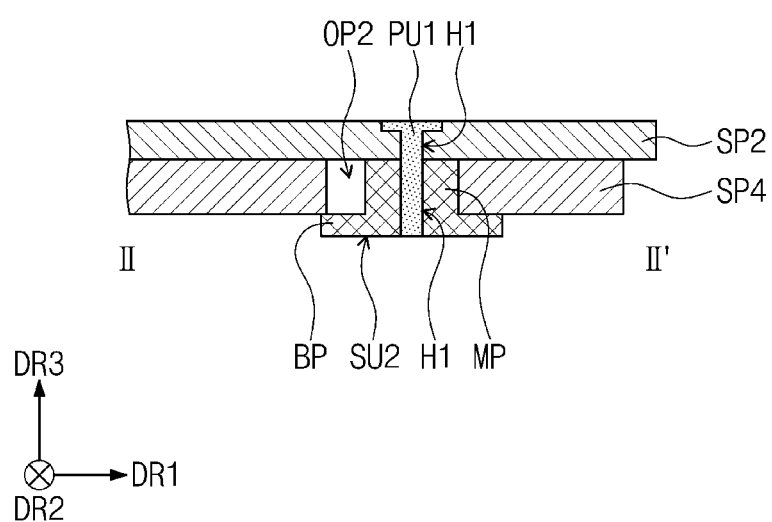
FIG. 14 is a cross-sectional view taken along line II-II' shown in FIG. 12.
Figure 15:
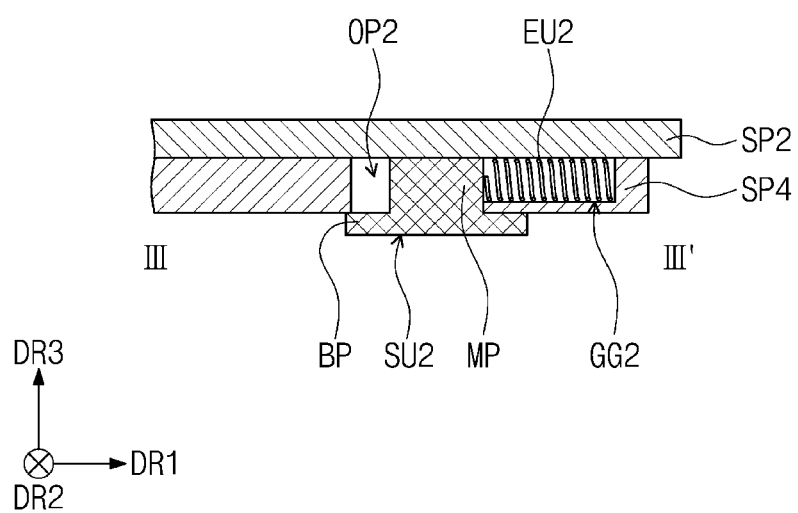
FIG. 15 is a cross-sectional view taken along line shown in FIG. 12.

FIG. 12 is a plan view showing a structure in which the first and second supporters SP1 and SP2 are disposed on the third and fourth supporters SP3 and SP4 shown in FIG. 10. FIG. 13 is a cross-sectional view taken along line I-I' shown in FIG. 12. FIG. 14 is a cross-sectional view taken along line II-II' shown in FIG. 12. FIG. 15 is a cross-sectional view taken along line shown in FIG. 12.

Referring to FIG. 12, the first supporter SP1 may be disposed on the third supporter SP3, and the second supporter SP2 may be disposed on the fourth supporter SP4. Second and third sides BS3, which are opposite to each other in the second direction DR2 of the first supporter SP1, and second and third sides BS4, which are opposite to each other in the second direction DR2 of the second supporter SP2, may have a stepped shape.

Referring to FIGS. 12 and 13, the spacers SC may be disposed between the first supporter SP1 and the second supporter SP2 and between the third supporter SP3 and the fourth supporter SP4. For example, the protrusions PRT of the spacers SC may be disposed between the first supporter SP1 and the second supporter SP2, and the support bars SB of the spacers SC may be respectively disposed in the grooves G. The protrusions PRT may be disposed adjacent to the second and third sides BS3 of the first supporter SP1 and the second and third sides BS4 of the second supporters SP2.

The first supporter SP1 and the second supporter SP2 may be spaced apart from each other in the first direction DR1 by the protrusions PRT. A first side S5 of the first supporter SP1 and a first side S6 of the second supporter SP2, which extend in the second direction DR2 and face each other in the first direction DR1, may be spaced apart from each other by a width of the protrusions PRT.

The distal side S7 of the first supporter SP1, which is opposite to the first side S5 of the first supporter SP1, may be disposed distal to the distal side S3 of the third supporter SP3. The distal side S8 of the second supporter SP2, which is opposite to the first side S6 of the second supporter SP2, may be disposed distal to the distal side S4 of the second supporter SP2.

The first and second sliding parts SU1 and SU2 may be connected to the first and second supporters SP1 and SP2 by first pin parts PU1. The structure in which the first sliding part SU1 is connected to the first supporter SP1 may be substantially the same as the structure in which the second sliding part SU2 is connected to the second supporter SP2. Accordingly, hereinafter, the structure in which one second sliding part SU2 is connected to the second supporter SP2 will be described as an example with reference to FIG. 14. In addition, the structure in which one second elastic part EU2 is disposed in the second guide groove GG2 will be described as an example with reference to FIG. 15.

Referring to FIGS. 14 and 15, the second sliding part SU2 may be disposed in the second opening OP2 and may be connected to the second supporter SP2 by the first pin part PU1. For example, the first pin part PU1 may be inserted into first holes H1 defined in the second supporter SP2 and the second sliding part SU2 such that the second supporter SP2 and the second sliding part SU2 are connected to each other. As an example, the first pin part PU1 may be a screw.

The bottom portion BP may be disposed under the fourth supporter SP4. The moving portion MP may be disposed in the second opening OP2 and may be connected to the second supporter SP2 by the first pin part PU1. A width in the first direction DR1 of the bottom portion BP may be greater than the second opening OP2. The moving portion MP may move in the first direction DR1 along the second opening OP2. Accordingly, the second sliding part SU2 may move in the first direction DR1 along the second opening OP2.

The second elastic part EU2 may be disposed in the second guide groove GG2 and may contact the moving portion MP of the second sliding part SU2. The second sliding part SU2 may be disposed on a right side of the second opening OP2. Since the protrusions PRT are disposed between the first supporter SP1 and the second supporter SP2, the second elastic part EU2 may not push the second sliding part SU2 to a left side of the second opening OP2. This structure will be described in detail with reference to FIG. 21.

Figure 16:
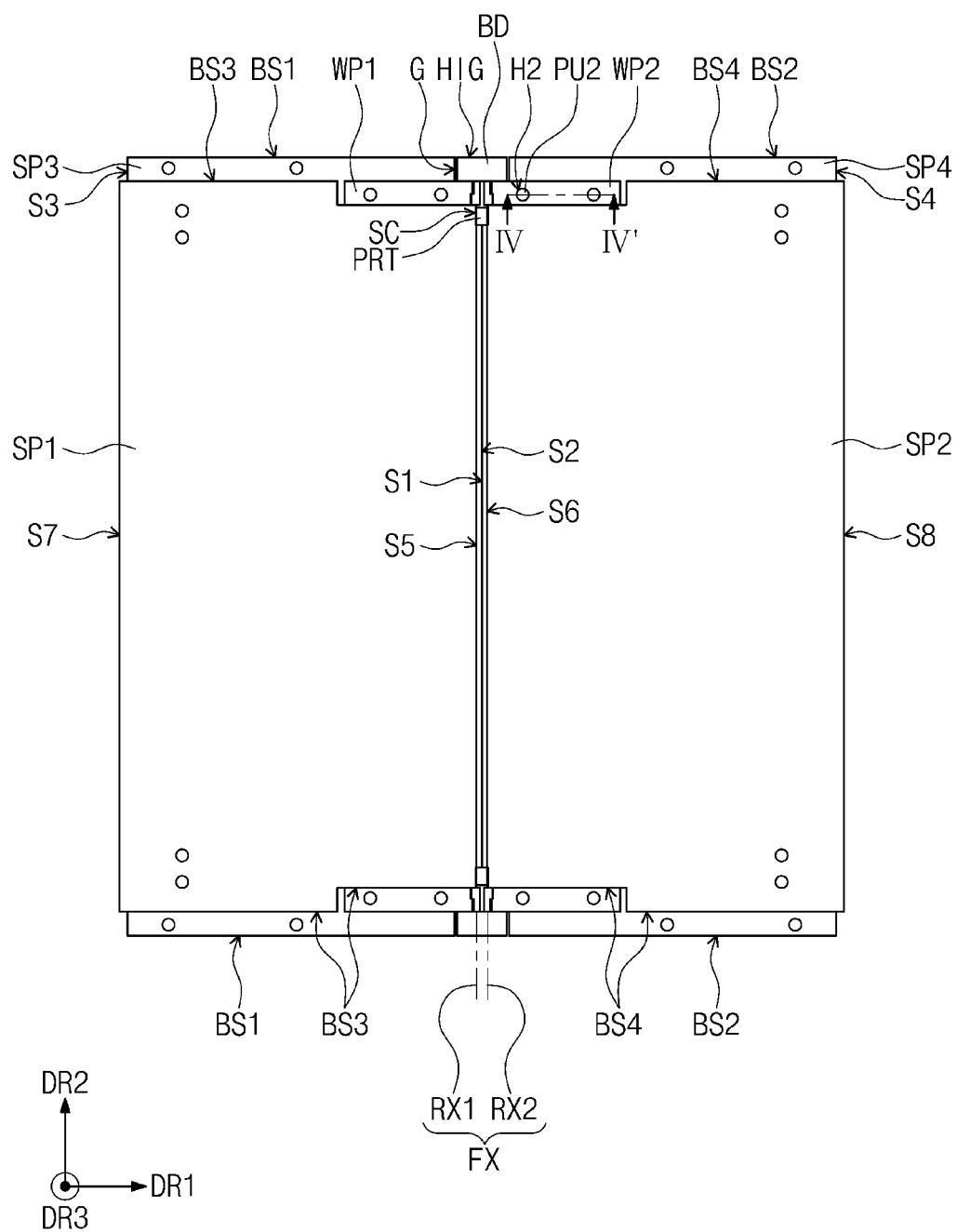
FIG. 16 is a plan view showing a structure in which hinge parts are connected to the first and second supporters shown in FIG. 10.
Figure 17:
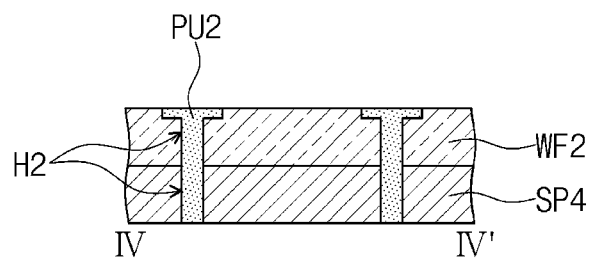
FIG. 17 is a cross-sectional view taken along line IV-IV' shown in FIG. 16.
Figure 17:
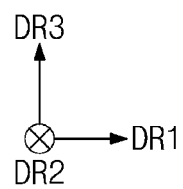
Figure 18:
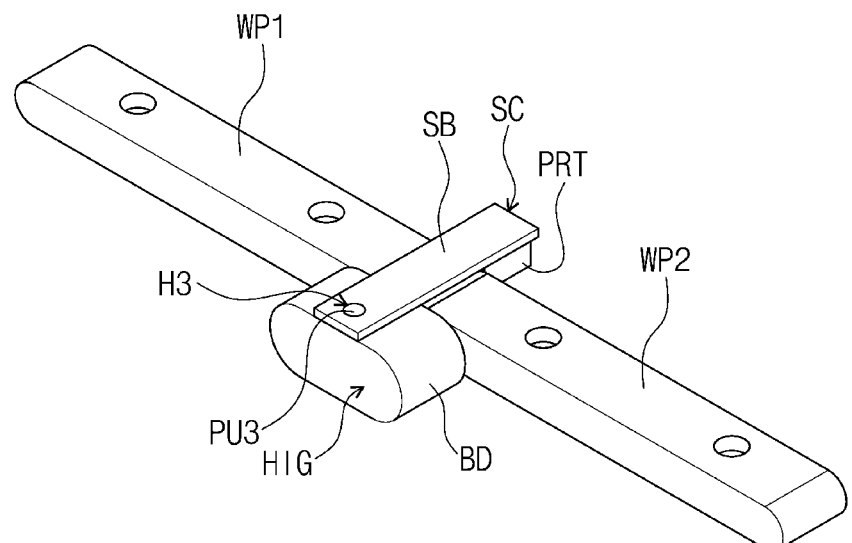
FIG. 18 is a perspective view showing a spacer connected to a hinge part shown in FIG. 17.
Figure 18:
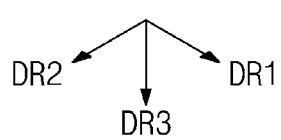

FIG. 16 is a plan view showing a structure in which the hinge parts HIG are connected to the first and second supporters SP1 and SP2 shown in FIG. 10. FIG. 17 is a cross-sectional view taken along line IV-IV' shown in FIG. 16. FIG. 18 is a perspective view showing the spacer SC connected to the hinge part HIG shown in FIG. 17.

The portion of the hinge part HIG shown in FIG. 18 is obtained by turning the hinge part HIG shown in FIG. 17 upside down, and the portion of the hinge part HIG shown in FIG. 18 may be a lower portion of the hinge part HIG.

Referring to FIG. 16, the hinge parts HIG may be disposed on the third and fourth supporters SP3 and SP4. The hinge parts HIG may be connected to the portions of the third and fourth supporters SP3 and SP4 adjacent to the second and third sides BS1 of the third supporter SP3 and the second and third sides BS2 of the fourth supporters SP4. For example, the first and second wing portions WP1 and WP2 of the hinge parts HIG may be respectively connected to the third and fourth supporters SP3 and SP4 by second pin parts PU2.

In a plan view, the body portions BD may overlap the grooves G. The first and second wing portions WP1 and WP2 may not overlap the first and second supporters SP1 and SP2.

Since the structure in which the first wing portion WP1 is connected to the third supporter SP3 is substantially the same as the structure in which the second wing portion WP2 is connected to the fourth supporter SP4, hereinafter, the structure in which the second wing portion WP2 is connected to the fourth supporter SP4 will be described with reference to FIG. 17 as an example.

Referring to FIG. 17, the second wing portion WP2 of the hinge part HIG may be connected to the fourth supporter SP4 by the second pin parts PU2. For example, the second pin parts PU2 may be inserted into second holes H2 defined in the second wing portion WP2 and the fourth supporter SP4 such that the second wing portion WP2 and the fourth supporter SP4 are connected to each other. As an example, the second pin parts PU2 may be a screw.

Referring to FIG. 16, the hinge part HIG may provide the first rotation axis RX1 and the second rotation axis RX2 extending in the second direction DR2 to the third supporter SP3 and the fourth supporter SP4, respectively. The third and fourth supporters SP3 and SP4 may rotate about the first and second rotation axes RX1 and RX2 by the hinge parts HIG.

Referring to FIG. 18, the spacer SC may be connected to a lower portion of the hinge part HIG and may extend in the second direction DR2. For example, the support bar SB of the spacer SC may be connected to the lower portion of the hinge part HIG and may extend in the second direction DR2.

The support bar SB may be connected to a lower portion of the body portion BD and may extend in the second direction DR2. A third pin part PU3 may be connected to the body portion BD through a third hole H3 defined in the support bar SB. The protrusion PRT may protrude from the end of the support bar SB, which is not connected to the body portion BD. In a plan view, the protrusion PRT may not overlap the first and second wing portions WP1 and WP2.

Figure 19:
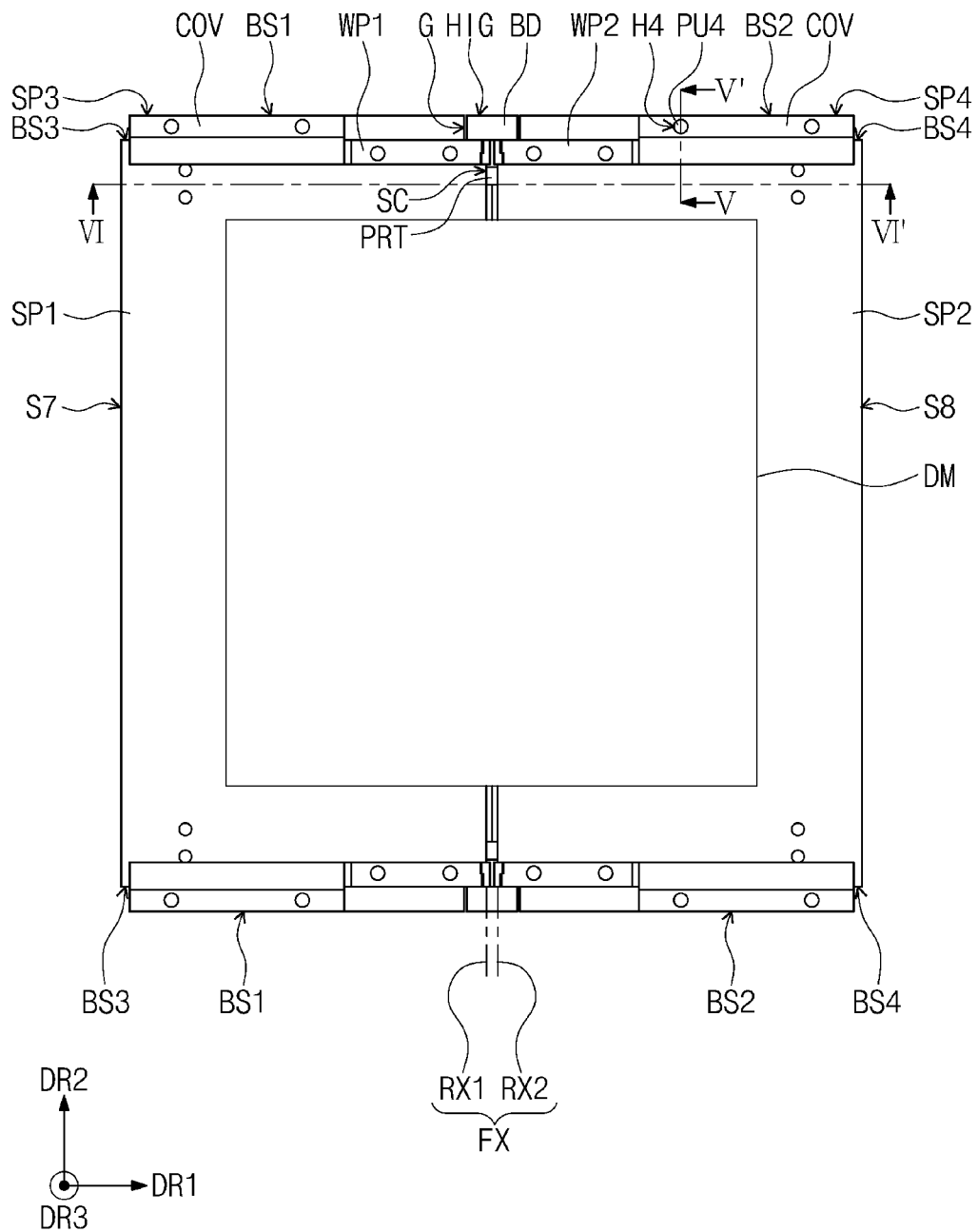
FIG. 19 is a plan view showing a structure in which cover parts are connected to third and fourth supporters and a structure in which a display module is disposed on first and second supporters shown in FIG. 10.
Figure 20:
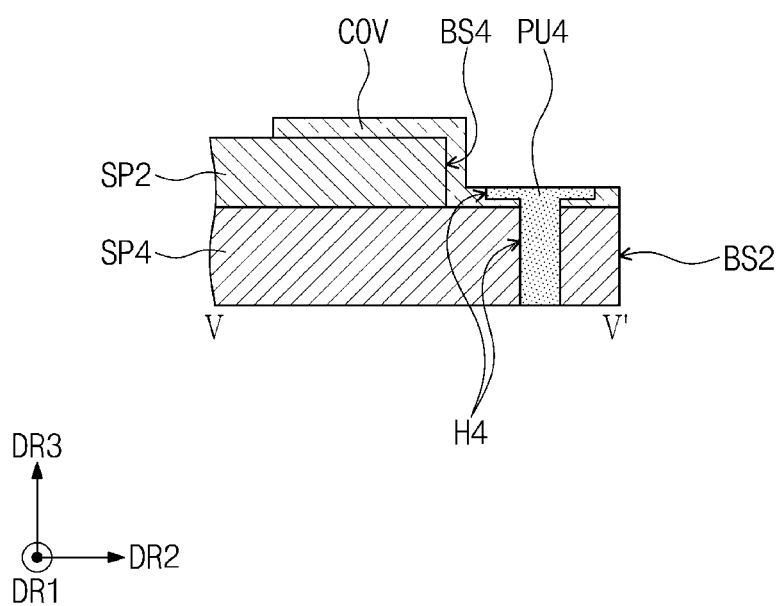
FIG. 20 is a cross-sectional view taken along line V-V' shown in FIG. 19.

FIG. 19 is a plan view showing a structure in which the cover parts COV are connected to the third and fourth supporters SP3 and SP4 and a structure in which the display module DM is disposed on the first and second supporters SP1 and SP2 shown in FIG. 10. FIG. 20 is a cross-sectional view taken along line V-V' shown in FIG. 19.

Referring to FIG. 19, the display module DM may be disposed between the spacers SC in a plan view. In detail, the display module DM may be disposed between the protrusions PRT. Accordingly, the display module DM may not overlap the spacers SC.

The cover parts COV may not overlap the hinge parts HIG. The cover parts COV may cover the second and third sides BS1 of the third supporter SP3 and the second and third sides BS2 of the fourth supporters SP4 and the second and third sides BS3 of the first supporter SP1 and second and third sides BS4 of the second supporters SP2.

The cover parts COV may be disposed on the portions of the third and fourth supporters SP3 and SP4 adjacent to the second and third sides BS1 and BS2 of the third and fourth supporters SP3 and SP4 and may be connected to the third and fourth supporters SP3 and SP4 by a plurality of fourth pin parts PU4. The cover parts COV may be disposed on the portions of the first and second supporters SP1 and SP2 adjacent to the second and third sides BS3 and BS4 of the first and second supporters SP1 and SP2 and may not be connected to the first and second supporters SP1 and SP2.

The structures in which the cover parts COV are connected to the third and fourth supporters SP3 and SP4 and disposed on the first and second supporters SP1 and SP2 may be substantially the same as each other. Accordingly, hereinafter, the structure in which one cover part COV is connected to the fourth supporter SP4 and disposed on the second supporter SP2 will be described with reference to FIG. 20.

Referring to FIG. 20, the cover part COV may be disposed on the portion of the fourth supporter SP4 adjacent to one of the second and third sides BS2 of the fourth supporter SP4 and may be connected to the fourth supporter SP4. Fourth holes H4 may be defined in the cover part COV and the fourth supporter SP4, and the fourth pin part PU4 may be inserted into the fourth holes H4 such that the cover part COV and the fourth supporter SP4 are connected to each other.

The cover part COV may be disposed on the portion of the second supporter SP2 adjacent to one of the second and third sides BS4 of the second supporter SP2 and may not be connected to the second supporter SP2.

Figure 21:
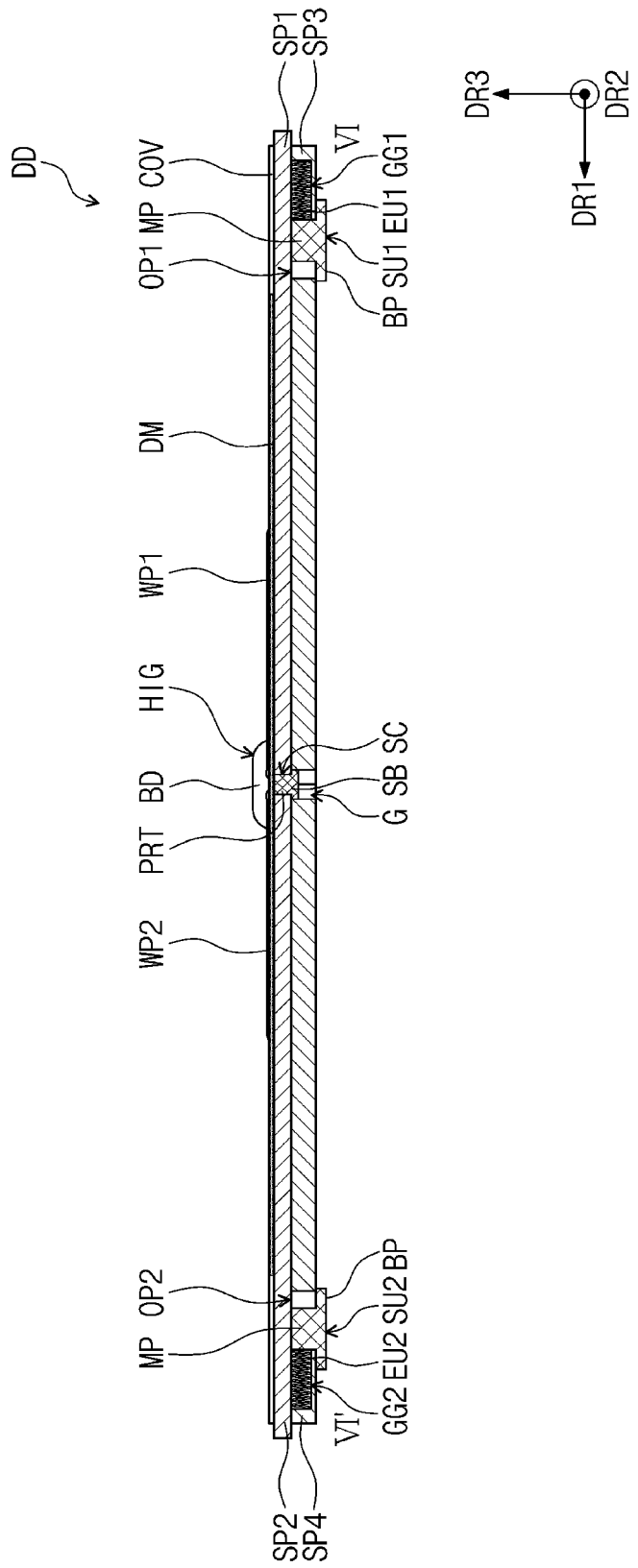
FIG. 21 is a cross-sectional view taken along line VI-VI' shown in FIG. 19.
Figure 22:
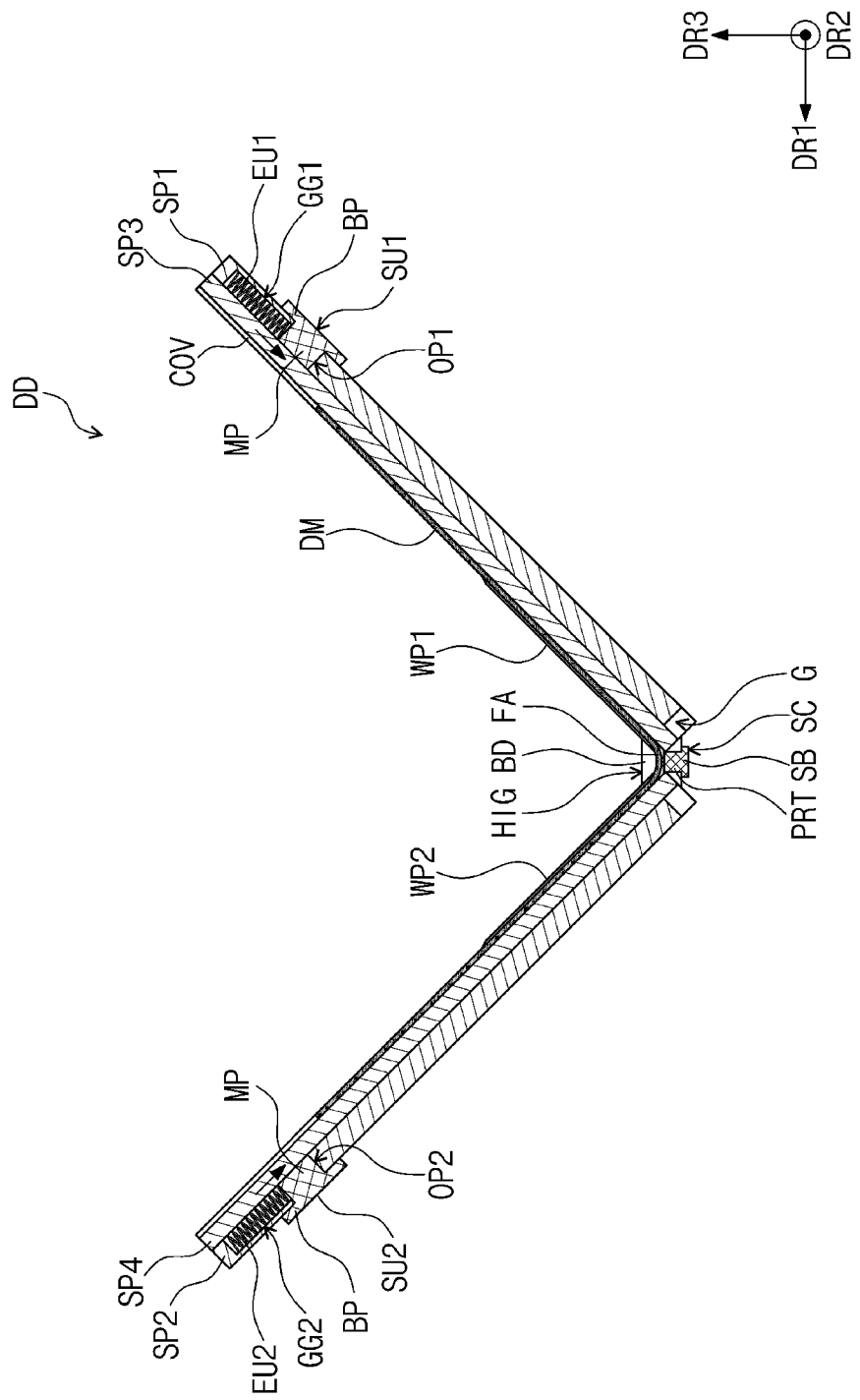
FIG. 22 is a view showing a folded state of a display device shown in FIG. 21.
Figure 23:
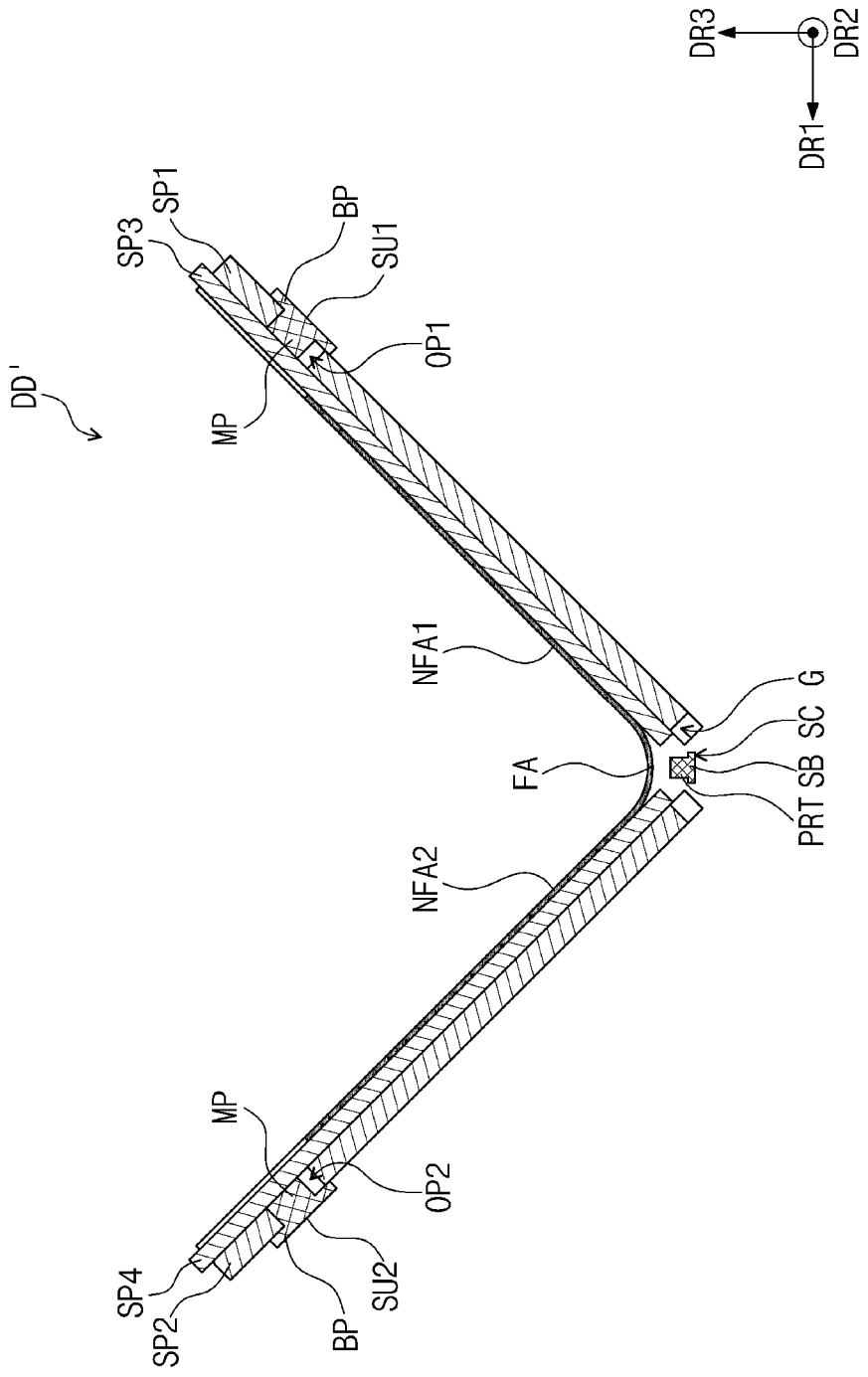
FIG. 23 is a view showing a folded state of a comparative display device to which no elastic member is applied.

FIG. 21 is a cross-sectional view taken along line VI-VI' shown in FIG. 19. FIG. 22 is a view showing a folded state of the display device shown in FIG. 21. FIG. 23 is a view showing a folded state of a comparative display device to which no elastic member is applied.

For the convenience of explanation, FIGS. 22 and 23 schematically show states of display devices DD and DD' that are folded at about 90 degrees. In addition, the hinge parts HIG are omitted from FIG. 23.

Referring to FIG. 21, the first and second elastic parts EU1 and EU2 may be disposed distal to the first and second sliding parts SU1 and SU2, respectively, and may provide elastic forces to the first and second sliding parts SU1 and SU2. The elastic forces may be provided toward a center portion of the display device DD. The elastic forces may be transmitted to the first and second supporters SP1 and SP2 connected to the first and second sliding parts SU1 and SU2.

Since the protrusion PRT is disposed between the first supporter SP1 and the second supporter SP2, the first supporter SP1 and the second supporter SP2 do not move toward the center portion of the display device DD even though the elastic forces are transmitted to the first supporter SP1 and the second supporter SP2. The third and fourth supporters SP3 and SP4 may rotate about the rotation axes RX1 and RX2 by the hinge part HIG.

Referring to FIG. 22, the third and fourth supporters SP3 and SP4 may rotate to allow the display module DM to be inwardly folded (in-folding). For example, as the third and fourth supporters SP3 and SP4 rotate, the first and second supporters SP1 and SP2 move together with the third and fourth supporters SP3 and SP4, and thus, the display module DM may be inwardly folded.

Referring to FIG. 23, when the comparative display device DD' to which the elastic parts EU1 and EU2 are not applied is folded, a first sliding part SU1 may maintain a state of being positioned at the right side of the first opening OP1. In addition, a second sliding part SU2 may maintain a state of being positioned at the left side of the second opening OP2. Therefore, the first supporter SP1 and the second supporter SP2 may be spaced apart from the protrusion PRT. An interval between the first supporter SP1 and the second supporter SP2 may be widened, and a tensile force is generated in the folding area FA. As a result, the folding area FA may be deformed.

Referring to FIG. 22, when the display device DD is folded, the first sliding part SU1 and the second sliding part SU2 may move in a direction to be closer to each other by the elastic parts EU1 and EU2. For example, the body portion BD of the first sliding part SU1 may move toward the center portion of the display device DD by the first elastic part EU1 and may be disposed on the left side of the first opening OP1. The body portion BD of the second sliding part SU2 may move toward the center portion of the display device DD by the second elastic part EU2 and may be disposed on the right side of the second opening OP2.

As the first sliding part SU1 and the second sliding part SU2 move closer to each other, the first supporter SP1 and the second supporter SP2 respectively connected to the first sliding part SU1 and the second sliding part SU2 may move in a direction to be closer to each other.

Since the first supporter SP1 is not fixed to the cover part COV, the first supporter SP1 may move together with the first sliding part SU1 when the first sliding part SU1 connected to the first supporter SP1 moves along the first opening OP1. Since the second supporter SP2 is not fixed to the cover part COV, the second supporter SP2 may move together with the second sliding part SU2 when the second sliding part SU2 connected to the second supporter SP2 moves along the second opening OP2.

Since the first supporter SP1 and the second supporter SP2 move to be closer to each other, the tensile force generated in the folding area FA may be reduced. Consequently, when the display device DD is folded, the first supporter SP1 and the second supporter SP2, which support the display module DM, move toward the center portion of the display device DD, the tensile force in the folding area FA may be reduced, and thus, the folding area FA may be prevented from being deformed.

When the display device DD is unfolded as shown in FIG. 21, the first supporter SP1 and the second supporter SP2 may be spaced apart from each other by the protrusion PRT. Since the first supporter SP1 and the second supporter SP2 are spaced apart from each other by the protrusion PRT without contacting each other, the display device DD may be unfolded more easily, so that the folding area FA does not crease.

Although the embodiments of the invention have been described, it is understood that the invention should not be limited to these embodiments but various changes and modifications can be made by one ordinary skilled in the art within the spirit and scope of the invention as claimed. Therefore, the disclosed subject matter should not be limited to any embodiment described herein, and the scope of the invention shall be determined according to the claims.

What is claimed is:

1. A display device comprising:
   a display module;
   a first supporter and a second supporter disposed under the display module and arranged in a first direction;
   spacers disposed between the first supporter and the second supporter;
   a third supporter and a fourth supporter respectively disposed under the first supporter and the second supporter;
   hinge parts connected to the third supporter and the fourth supporter;
   sliding parts disposed in openings defined in the third supporter and the fourth supporter and connected to the first supporter and the second supporter; and
   elastic parts disposed in guide grooves defined in the third supporter and the fourth supporter and extending in the first direction from the openings toward a distal portion of the third supporter and a distal portion of the fourth supporter.

2. The display device of claim 1, wherein
   the spacers are arranged in a second direction crossing the first direction, and
   the display module is disposed between the spacers.

3. The display device of claim 2, wherein the display device comprises:
   grooves defined at portions where a first side of the third supporter is connected to a second side and a third side of the third supporter and at portions where a first side of the fourth supporter is connected to a second side and a third side of the fourth supporter, wherein
   the second side and the third side of the third supporter are opposite to each other in the second direction,
   the second side and the third side of the fourth supporter are opposite to each other in the second direction,
   the first side of the third supporter and the first side of the fourth supporter face each other in the first direction,
   the grooves extend in the second direction, and
   the spaces are disposed in the grooves.

4. The display device of claim 3, wherein the hinge parts are disposed on the third supporter and the fourth supporter and connected to portions of the third supporter and the fourth supporter, which are adjacent to the second and third sides of the third supporter and the second and third sides of the fourth supporter.

5. The display device of claim 3, wherein
   the hinge parts provide rotation axes extending in the second direction, to the third supporter and the fourth supporter, respectively, and
   the third supporter and the fourth supporter rotate about the rotation axes.

6. The display device of claim 3, wherein each of the spacers comprises:
   a support bar connected to a lower portion of a corresponding one of the hinge parts and extending in the second direction; and
   a protrusion protruding upward from the support bar, wherein
   the support bars of the spacers are disposed in the grooves, and
   the protrusions of the spacers are disposed between the first supporter and the second supporter.

7. The display device of claim 6, wherein the protrusions are disposed adjacent to a second side and a third side of the first supporter, which are opposite to each other in the second direction, and a second side and a third side of the second supporter, which are opposite to each other in the second direction.

8. The display device of claim 6, wherein each of the hinge parts comprises:
   a body portion overlapping the grooves in a plan view; and a first wing portion and a second wing portion connected to the body portion, extending in the first direction, and arranged in the first direction, wherein the first wing portion and the second wing portion are respectively connected to the third supporter and the fourth supporter, and a side of the first wing portion and a side of the second wing portion, which face each other, are connected to the body portion to rotate.

9. The display device of claim 8, wherein the support bar is connected to a lower portion of the body portion, and the protrusion does not overlap the first wing portion and the second wing portion in a plan view.

10. The display device of claim 2, further comprising cover parts covering:

a second side and a third side of the first supporter, which are opposite to each other in the second direction, a second side and a third side of the second supporter, which are opposite to each other in the second direction, a second side and a third side of the third supporter, which are opposite to each other in the second direction, and a second side and a third side of the fourth supporter, which are opposite to each other in the second direction.

11. The display device of claim 10, wherein the cover parts are:

disposed on portions of the third and fourth supporters, which are adjacent to the second and third sides of the third supporter and the second and third sides of the fourth supporter, connected to the third supporter and the fourth supporter, and disposed on portions of the first supporter and the second supporter, which are adjacent to the second and third sides of the first supporter and the second and third sides of the second supporter.

12. The display device of claim 11, wherein the cover parts do not overlap the hinge parts and are not connected to the first and second supporters.

13. The display device of claim 1, wherein:

a first side of the third supporter and a first side of the fourth supporter face each other in the first direction, and the openings are adjacent to a distal side of the third supporter, which is opposite to the first side of the third supporter, and a distal side of the fourth supporter, which is opposite to the first side of the fourth supporter.

14. The display device of claim 13, wherein the guide grooves are defined between the openings defined in the third supporter and the distal side of the third supporter and between the openings defined in the fourth supporter and the distal side of the fourth supporter.

15. The display device of claim 14, wherein the elastic parts contact sides of the sliding parts facing the distal sides of the third and fourth supporters.

16. The display device of claim 1, wherein each of the sliding parts comprises:

a bottom portion; and a moving portion extending upward from the bottom portion and disposed in a corresponding one of the openings, wherein the bottom portions of the sliding parts are disposed under the third supporter and the fourth supporter, and the moving portions of the sliding parts are connected to the first supporter and the second supporter.

17. The display device of claim 16, wherein a width in the first direction of the bottom portion is greater than each of the openings, and a width in the first direction of the moving portion is smaller than each of the openings.

18. The display device of claim 1, wherein the sliding parts connected to the first supporter and the sliding parts connected to the second supporter move in a direction to be closer to each other by the elastic parts when the third supporter and the fourth supporter rotate by the hinge parts.

19. A display device comprising:

a display module;

a first supporter and a second supporter disposed under the display module and arranged in a first direction;

a spacer disposed between the first supporter and the second supporter;

a third supporter and a fourth supporter respectively disposed under the first supporter and the second supporter;

a hinge part connected to the third supporter and the fourth supporter;

a sliding part connected to each of the first supporter and the second supporter through an opening defined in each of the third supporter and the fourth supporter; and an elastic part disposed between the sliding part and each of a distal side of the third supporter and a distal side of the fourth supporter, wherein the distal side of the third supporter and the distal side of the fourth supporter are opposite to a first side of the third supporter and a first side of the fourth supporter, respectively, and the first side of the third supporter and the first side of the fourth supporter face each other in the first direction, wherein the sliding part connected to the first supporter and the sliding part connected to the second supporter move in a direction to be closer to each other by the elastic part when the third and fourth supporters rotate by the hinge part.

20. The display device of claim 19, wherein the spacer comprises:

a support bar disposed between the third supporter and the fourth supporter and connected to a lower portion of the hinge part; and a protrusion protruding upward from the support bar and disposed between the first supporter and the second supporter.

21. The display device of claim 19, wherein the display module does not overlap the spacer in a plan view.

22. The display device of claim 19, wherein the elastic part is disposed in a guide groove defined in each of the third and fourth supporters and extending in the first direction from the opening and contacts the sliding part.

23. The display device of claim 19, wherein the sliding part comprises:

a bottom portion; and a moving portion extending upward from the bottom portion, disposed in the opening, and connected to a corresponding one of the first and second supporters, wherein a width in the first direction of the bottom portion is greater than the opening, and a width in the first direction of the moving portion is smaller than the opening.

24. A display device comprising:
a display module;
a first supporter disposed under the display module;
a second supporter arranged in a first direction with the first supporter and disposed under the display module;
a third supporter disposed under the first supporter;
a fourth supporter disposed under the second supporter;
a spacer disposed between the first supporter and the second supporter and between the third supporter and the fourth supporter;
a hinge part connected to the third support and fourth supporter;
a first sliding part disposed in a first opening defined in the third supporter and connected to the first supporter;
a second sliding part disposed in a second opening defined in the fourth supporter and connected to the second supporter;
a first elastic part disposed in a first guide groove defined in the third supporter and extending toward a distal side of the third supporter, which is opposite to a first side of the third supporter, from the first opening; and
a second elastic part disposed in a second guide groove defined in the fourth supporter and extending toward a distal side of the fourth supporter, which is opposite to a first side of the fourth supporter, from the second opening,
wherein the first side of the third supporter and the first side of the fourth supporter face each other in the first direction.

* * * * *